US010212295B2

(12) United States Patent
Shirota et al.

(10) Patent No.: US 10,212,295 B2
(45) Date of Patent: Feb. 19, 2019

(54) RECORDING APPARATUS

(71) Applicant: SEIKO EPSON CORPORATION, Tokyo (JP)

(72) Inventors: Kenichi Shirota, Suwa (JP); Yoshiyuki Okazawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/441,102

(22) Filed: Feb. 23, 2017

(65) Prior Publication Data
US 2017/0251117 A1 Aug. 31, 2017

(30) Foreign Application Priority Data
Feb. 26, 2016 (JP) .................. 2016-035339

(51) Int. Cl.
| B41J 2/00 | (2006.01) |
| B41J 29/13 | (2006.01) |
| B41J 3/36 | (2006.01) |
| H04N 1/00 | (2006.01) |

(52) U.S. Cl.
CPC ..... *H04N 1/00551* (2013.01); *H04N 1/00533* (2013.01); *H04N 2201/0094* (2013.01); *H04N 2201/0422* (2013.01)

(58) Field of Classification Search
CPC ....... H04N 1/00533; H04N 2201/0094; H04N 2201/0422; H04N 1/00551; B41J 3/46; B41J 3/36; B41J 29/02; B41J 29/13
USPC .......... 347/101, 104, 108, 109, 110
See application file for complete search history.

(56) References Cited

FOREIGN PATENT DOCUMENTS

| JP | 11-058884 | 3/1999 |
| JP | 2014-013971 | 1/2014 |
| JP | 2015-123606 | 7/2015 |

*Primary Examiner* — An Do
(74) *Attorney, Agent, or Firm* — Workman Nydegger

(57) ABSTRACT

A recording apparatus includes: a housing including a recording-mechanism unit provided with a recording device that performs recording on a recording medium, peripheral walls of the housing being formed of a panel section, side-surface sections, and a rear-surface section; and a reading-mechanism unit that reads a document and covers and uncovers the top of the housing. The reading-mechanism unit includes a main body section having a document bed on which a document is mounted and an opening/closing body that covers and uncovers the document bed and has side surfaces. At least the main body section unit is accommodated in the interior of the peripheral walls of the housing when the reading-mechanism unit is closed. Each of the side surfaces of the opening/closing body and a corresponding one of the panel section and the side-surface sections are continuous with each other to form a single plane.

11 Claims, 18 Drawing Sheets

RECORDING APPARATUS

BACKGROUND

1. Technical Field

The present invention relates to recording apparatuses that perform recording on recording media.

2. Related Art

Ink jet printers, serving as an example of recording apparatuses, have a configuration in which a recording-mechanism unit that performs recording on a sheet, serving as an example of a recording medium, is covered in a housing formed of a resin material (see JP-A-11-58884 and JP-A-2015-123606).

Examples of problems with the related-art housings will be described below. An ink jet printer disclosed in JP-A-2015-123606 includes an operating section (tilt panel) and a cover at the front side thereof. The cover is provided so as to be pivotable relative to a removable lower tray and covers and uncovers a sheet discharge port by pivoting.

The cover and the operating section (tilt panel) described in JP-A-2015-123606 both constitute, in a closed state, the central portion of the front side of the printer. The cover, the operating section (tilt panel), and front-side portions of the main body of the printer located on both sides of the cover and the operating section together form a flat plane (surfaces flush with each other) and constitute the front exterior of the printer.

However, if a step is formed as a result of the surface of the operating section (tilt panel) being projected or retracted with respect to the front side of the main body of the printer due to low component accuracy or low assembling accuracy, the aesthetic appearance of the printer is deteriorated. The same problem occurs in the cover provided on the lower tray. Although this problem may be avoided by fabricating the components constituting the exterior of the printer with high precision, it would increase the cost.

An ink jet printer disclosed in JP-A-2014-013971 includes an image reading device at the upper part of the main body thereof. The image reading device is provided such that it can be opened and closed, and, by opening the image reading device, the interior of the ink jet printer is exposed, enabling maintenance of the interior of the ink jet printer (for example, replacement of ink cartridges). The ink jet printer disclosed in JP-A-2014-013971 has a horizontally extending boundary line formed between the lower edge of the image reading device and the upper edge of the main body of the ink jet printer, in the side surfaces of the ink jet printer.

As in this configuration, in which a boundary line is formed between the lower edge of the image reading device and the upper edge of the main body of the printer, in the side surface of the printer, a gap is produced between the lower edge of the image reading device and the upper edge of the main body of the printer due to low component accuracy. Such a gap not only deteriorates the aesthetic appearance, but also allows the entrance of dust into the interior of the printer. If the housing is precisely formed to avoid this problem, the cost will increase.

SUMMARY

An advantage of some aspects of the invention is that it suppresses an increase in the cost of components constituting the exterior of a printer and that it improves the aesthetic appearance of the printer.

A recording apparatus according to a first aspect of the invention includes: a housing including a recording-mechanism unit provided with a recording device that performs recording on a recording medium, peripheral walls of the housing being formed of a panel section, side-surface sections, and a rear-surface section; and a reading-mechanism unit that reads a document and covers and uncovers the top of the housing by being pivoted relative to the housing at the top of the housing. The reading-mechanism unit includes: a main body section having a document bed on which a document is mounted; and an opening/closing body that covers and uncovers the document bed and has side surfaces. At least the main body section is accommodated in the interior of the peripheral walls of the housing when the reading-mechanism unit is closed. Each of the side surfaces of the opening/closing body and a corresponding one of the panel section and the side-surface sections are continuous with each other to form a single plane.

According to this aspect, in a state in which the reading-mechanism unit is closed, at least the main body section of the reading-mechanism unit is accommodated in the interior of the housing. Furthermore, each of the side surfaces of the opening/closing body and a corresponding one of the panel section and the side-surface sections are continuous with each other to form a single plane. Hence, even if the component accuracy of the lower edge of the reading-mechanism unit and the upper edge of the housing of the recording-mechanism unit is low, such inaccuracy is unlikely to be noticed from the outside, and the entrance of dust or the like into the interior of the recording apparatus (i.e., into the interior of the recording-mechanism unit) can be suppressed. Consequently, it is possible to suppress an increase in the cost of the housing and, moreover, to improve the aesthetic appearance of the recording apparatus.

According to a second aspect of the invention, the recording apparatus according to the first aspect further includes, at a rear-side portion of the top of the recording apparatus: a set port into which a recording medium is set; and an upper-surface cover that covers the set port. The upper-surface cover has a width equivalent to the lateral width of the recording apparatus.

According to this aspect, the recording apparatus further includes, at a rear-side portion of the top of the recording apparatus: a set port into which a recording medium is set; and an upper-surface cover that covers the set port, and the upper-surface cover has a width equivalent to the lateral width of the recording apparatus. Hence, it is possible to avoid a problem of steps being produced at the left and right sides of the upper-surface cover in a closed state and, consequently, to suppress an increase in cost. Furthermore, it is possible to improve the aesthetic appearance of the recording apparatus.

According to a third aspect of the invention, in the recording apparatus according to the second aspect, the upper surface of the opening/closing body and the upper surface of the upper-surface cover form a single plane.

According to a fourth aspect of the invention, in the recording apparatus according to the second aspect, the upper-surface cover has side surfaces, and each of the side surfaces of the upper-surface cover and a corresponding one of the side-surface sections are continuous with each other to form a single plane.

According to this aspect, because the upper surface of the document bed cover and the upper surface of the upper-surface cover form a single plane, the aesthetic appearance of the recording apparatus can be improved. Furthermore, because each of the side surfaces of the upper-surface cover and a corresponding one of the side-surface sections are continuous with each other to form a single plane, the aesthetic appearance of the recording apparatus can be improved.

According to a fifth aspect of the invention, in the recording apparatus according to the first aspect, the side surfaces of the housing have cutout portions, through which portions of the side surfaces of the main body section are exposed.

According to this aspect, the side surfaces of the housing are provided with cutout portions, through which portions of the side surfaces of the main body section are exposed. Hence, a user can hook his/her fingers into the recesses in the side surfaces of the main body section when opening the reading-mechanism unit (main body section), and thus, the operability is improved.

According to a sixth aspect of the invention, in the recording apparatus according to the fifth aspect, the portions of the side surfaces of the main body section exposed through the cutout portions have a recessed shape.

According to this aspect, because the portions of the side surfaces of the main body section exposed through the cutout portions have a recessed shape, a user can more easily hook his/her fingers into the recesses in the side surfaces of the main body section, and thus, the operability is improved.

According to a seventh aspect of the invention, in the recording apparatus according to the sixth aspect, recessed portions having a recessed shape are recessed toward the inside of the main body section, and the cutout portions are provided in the side surfaces of the recording-mechanism unit, at positions closer to the front side than the center of the recording apparatus.

According to this aspect, because the cutout portions are provided in the side surfaces of the recording-mechanism unit, at positions closer to the front side than the center of the recording apparatus, the reading-mechanism unit (main body section) can be opened with a smaller force.

According to an eighth aspect of the invention, a recording apparatus includes a recording device that performs recording on a recording medium; and a tiltable operating section provided at the front side of the recording apparatus and having a width equivalent to the lateral width of the recording apparatus.

According to this aspect, because the operating section has a width equivalent to the lateral width of the recording apparatus, it is possible to avoid, without improving the component accuracy, a problem of steps being produced at the left and right sides of the operating section in a closed state and, consequently, to suppress an increase in cost.

According to a ninth aspect of the invention, the recording apparatus according to the eighth aspect further includes an interface section provided at the front side thereof. The interface section is covered by closing the operating section and is exposed by opening the operating section.

According to this aspect, because the recording apparatus further includes, at the front side thereof, an interface section to which a storage medium is inserted, and the interface section is covered by closing the operating section and is exposed by opening the operating section, there is no need to provide a dedicated cover for covering and uncovering the interface section, and thus, the cost can be reduced.

According to a tenth aspect of the invention, a recording apparatus includes: a recording device that performs recording on a recording medium; and a cassette that stores a recording medium and can be pulled out from the front side of the recording apparatus. The cassette includes a front-surface cover that covers and uncovers at least a portion of the front surface of the recording apparatus and has a width equivalent to the lateral width of the recording apparatus.

According to this aspect, because the cassette includes a front-surface cover that covers and uncovers at least a portion of the front surface of the recording apparatus and has a width equivalent to the lateral width of the recording apparatus, it is possible to avoid, without improving the component accuracy, a problem of steps being produced at the left and right sides of the front-surface cover in a closed state and, consequently, to suppress an increase in the cost.

According to an eleventh aspect of the invention, the recording apparatus according to the tenth aspect further includes an interface section at the front side thereof. The interface section is covered by closing the front-surface cover and is exposed by opening the front-surface cover.

According to this aspect, because the recording apparatus includes an interface section provided at the front side thereof, and the interface section is covered by closing the front-surface cover and is exposed by opening the front-surface cover, there is no need to provide a dedicated cover for covering and uncovering the interface section, and thus, the cost can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinbelow, embodiments of the invention will be described on the basis of the drawings. The same components in the embodiments will be denoted by the same reference signs. The descriptions of the components will be given only in the first embodiment, and they will be omitted in the subsequent embodiments.

Figure 1:
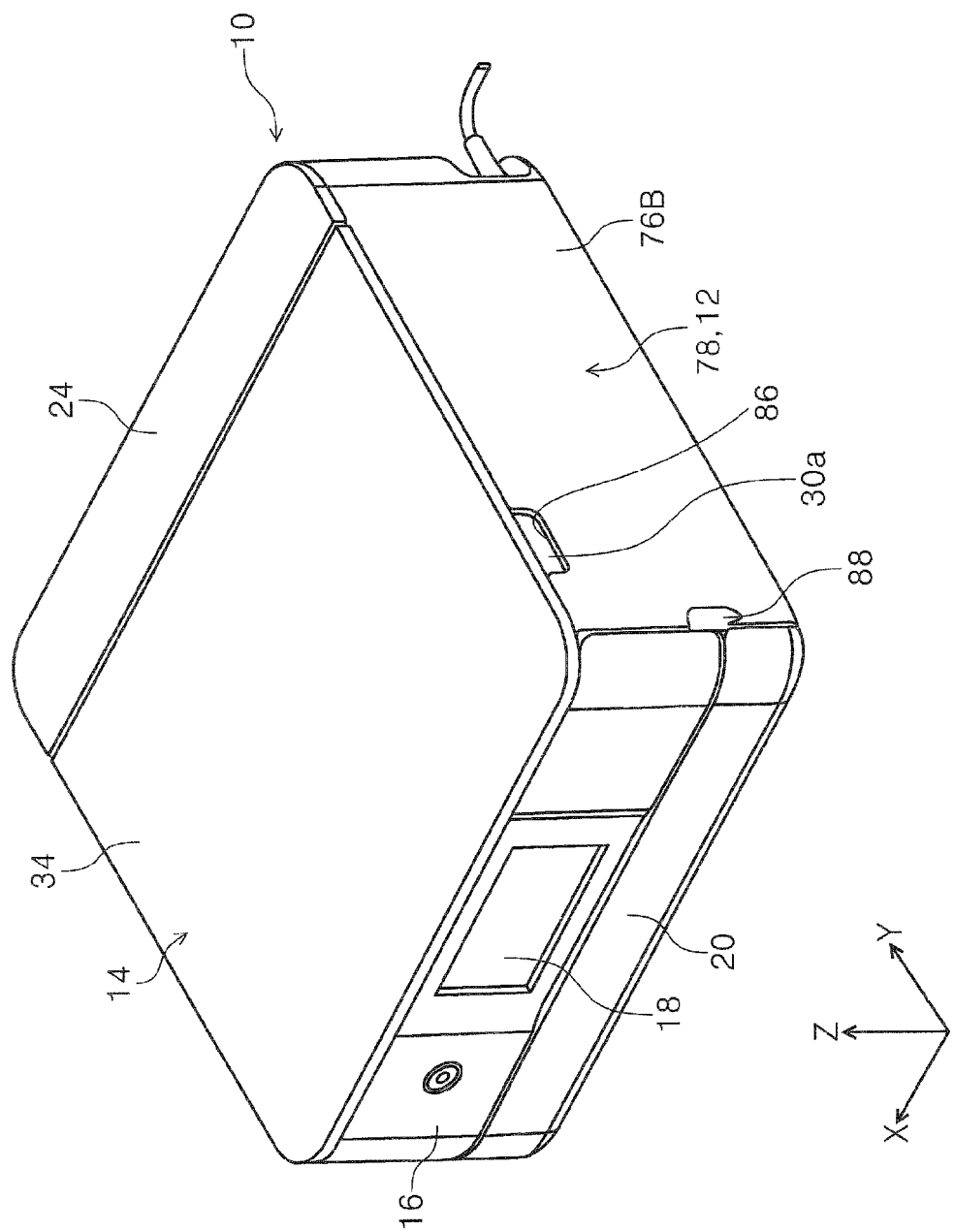
FIG. 1 is an external perspective view of a printer according to the invention.
Figure 2:
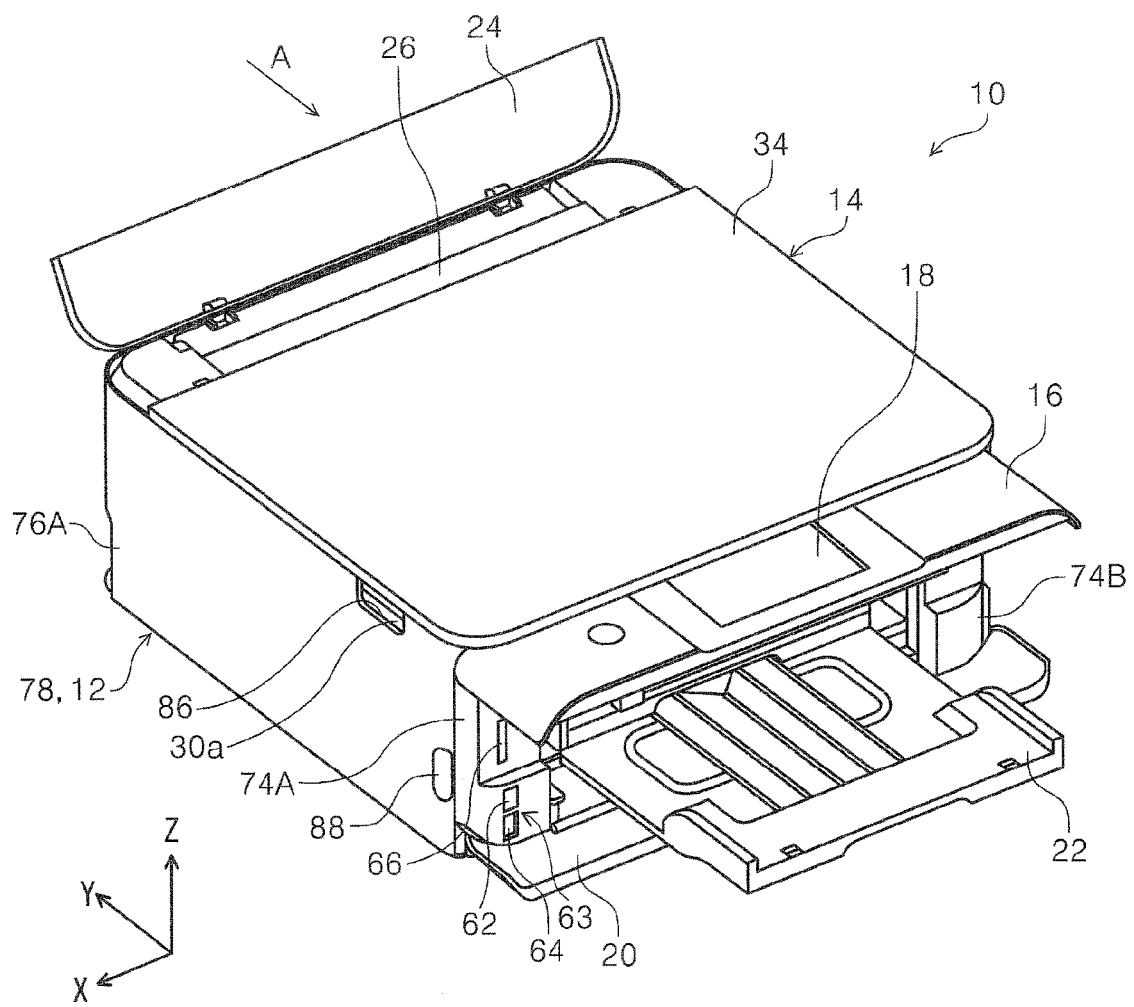
FIG. 2 is an external perspective view of the printer according to the invention, showing a state in which it performs a recording operation.
Figure 3:
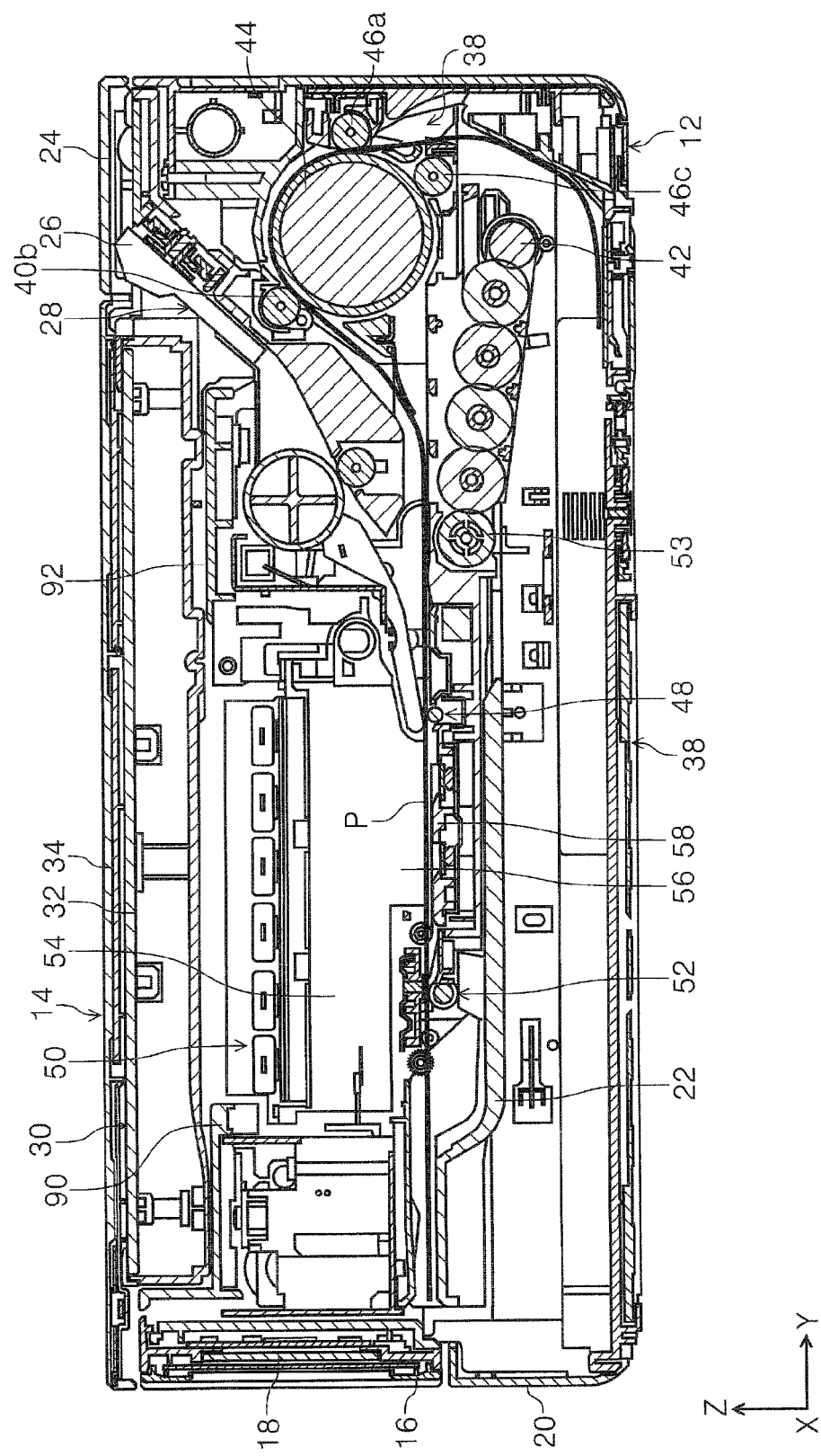
FIG. 3 is a sectional view showing a medium transport path in the printer according to the invention.
Figure 4:
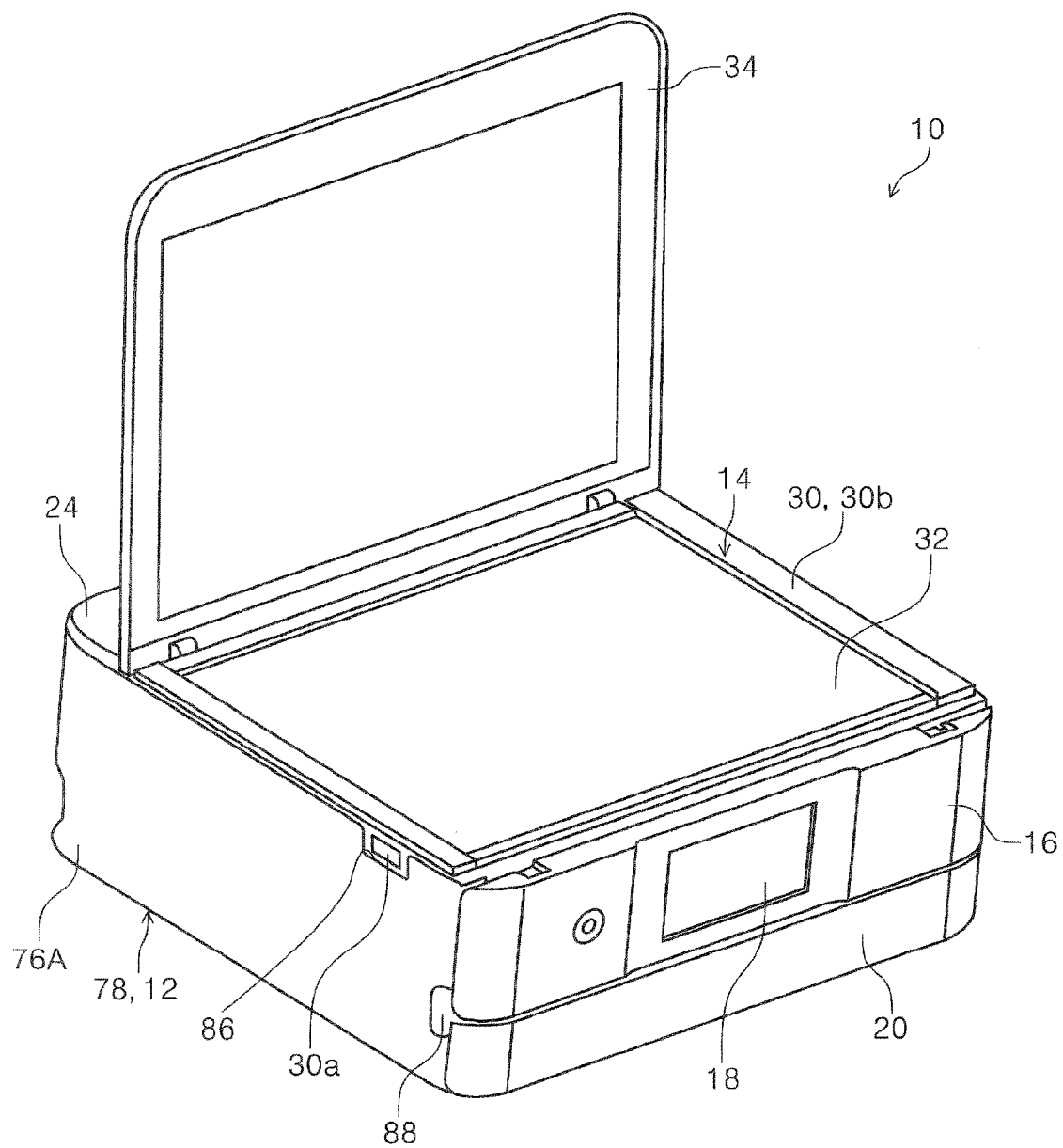
FIG. 4 is a perspective view of the printer according to the invention, showing a state in which a document bed cover is pivoted relative to a document bed.
Figure 5:
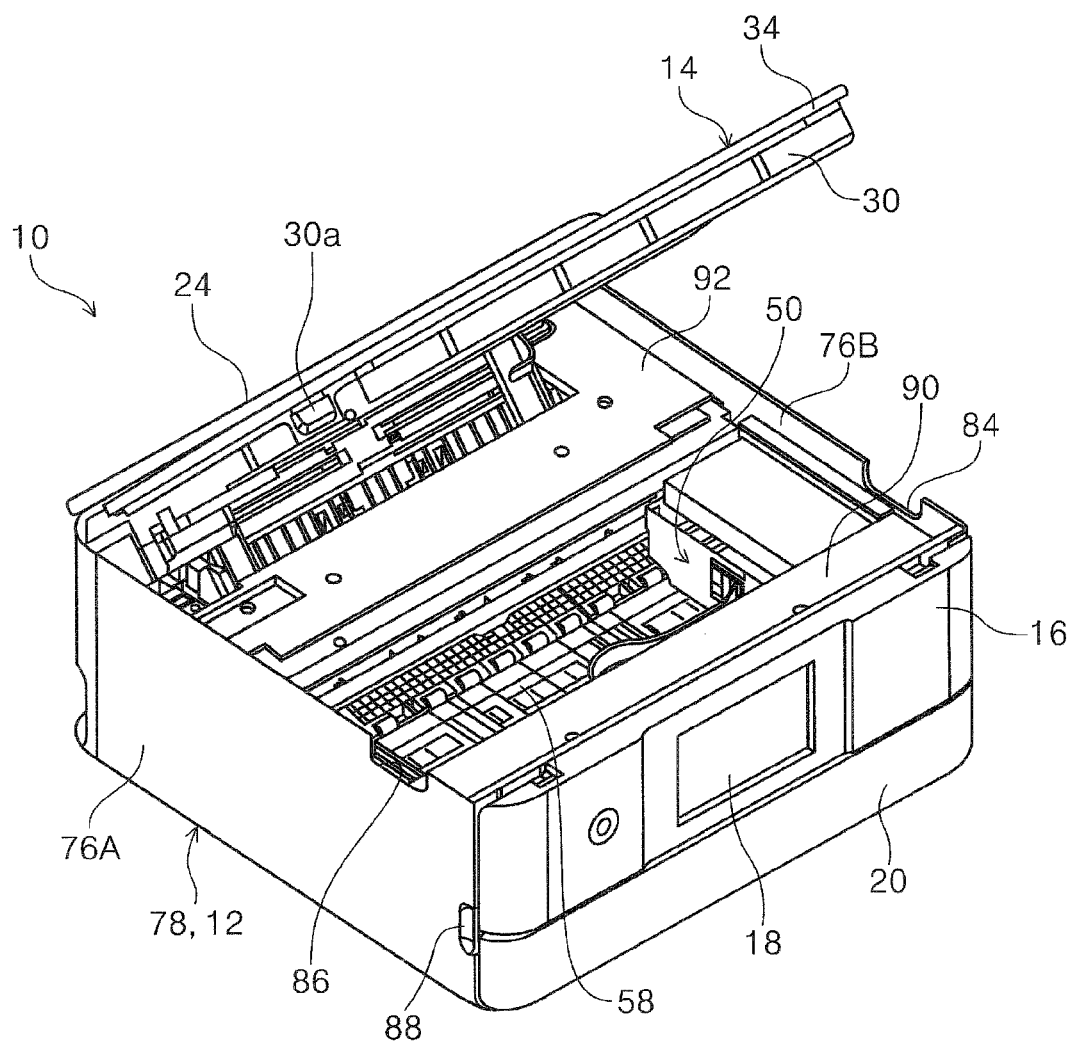
FIG. 5 is a perspective view of the printer according to the invention, showing a state in which a scanner unit is pivoted.
Figure 6:
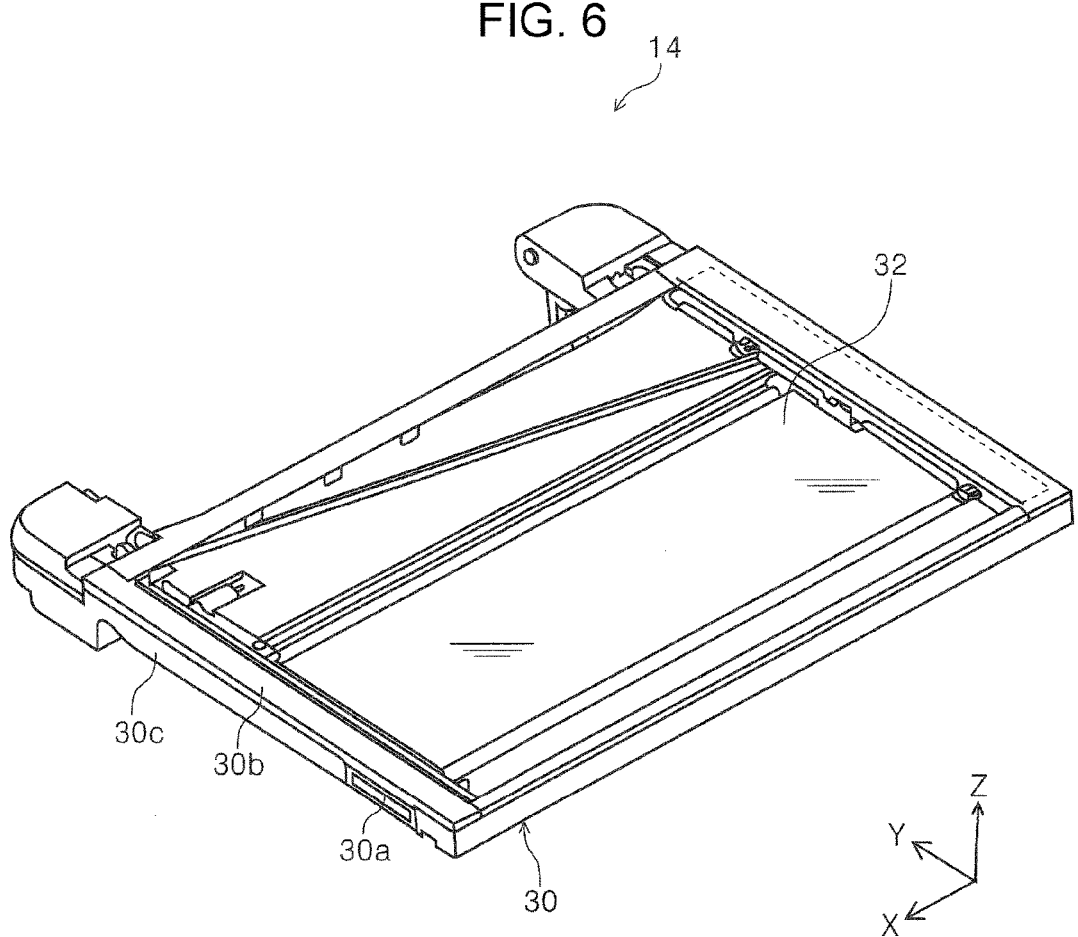
FIG. 6 is a perspective view of a main body section of the scanner unit according to the invention.
Figure 7:
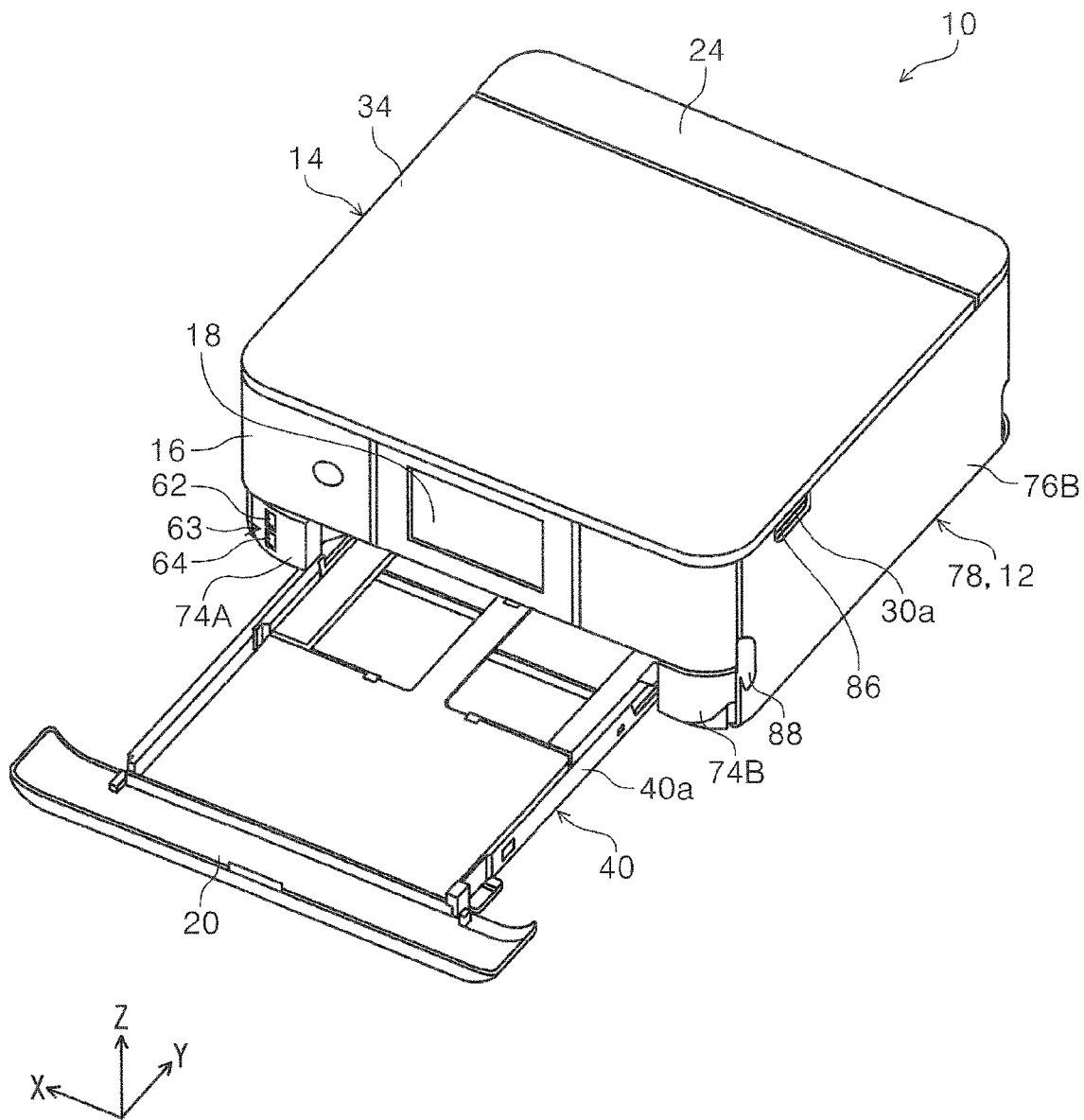
FIG. 7 is a perspective view of the printer according to the invention, showing a state in which a cassette is pulled out of a recording-mechanism unit.

FIG. 1 is an external perspective view of a printer according to the invention. FIG. 2 is an external perspective view of the printer according to the invention, showing a state in which it performs a recording operation. FIG. 3 is a sectional view showing a medium transport path in the printer according to the invention. FIG. 4 is a perspective view of the printer according to the invention, showing a state in which a document bed cover is pivoted relative to a document bed. FIG. 5 is a perspective view of the printer according to the invention, showing a state in which a scanner unit is pivoted. FIG. 6 is a perspective view of a main body section of the scanner unit according to the invention. FIG. 7 is a perspective view of the printer according to the invention, showing a state in which a cassette is pulled out of a recording-mechanism unit.

Figure 8:
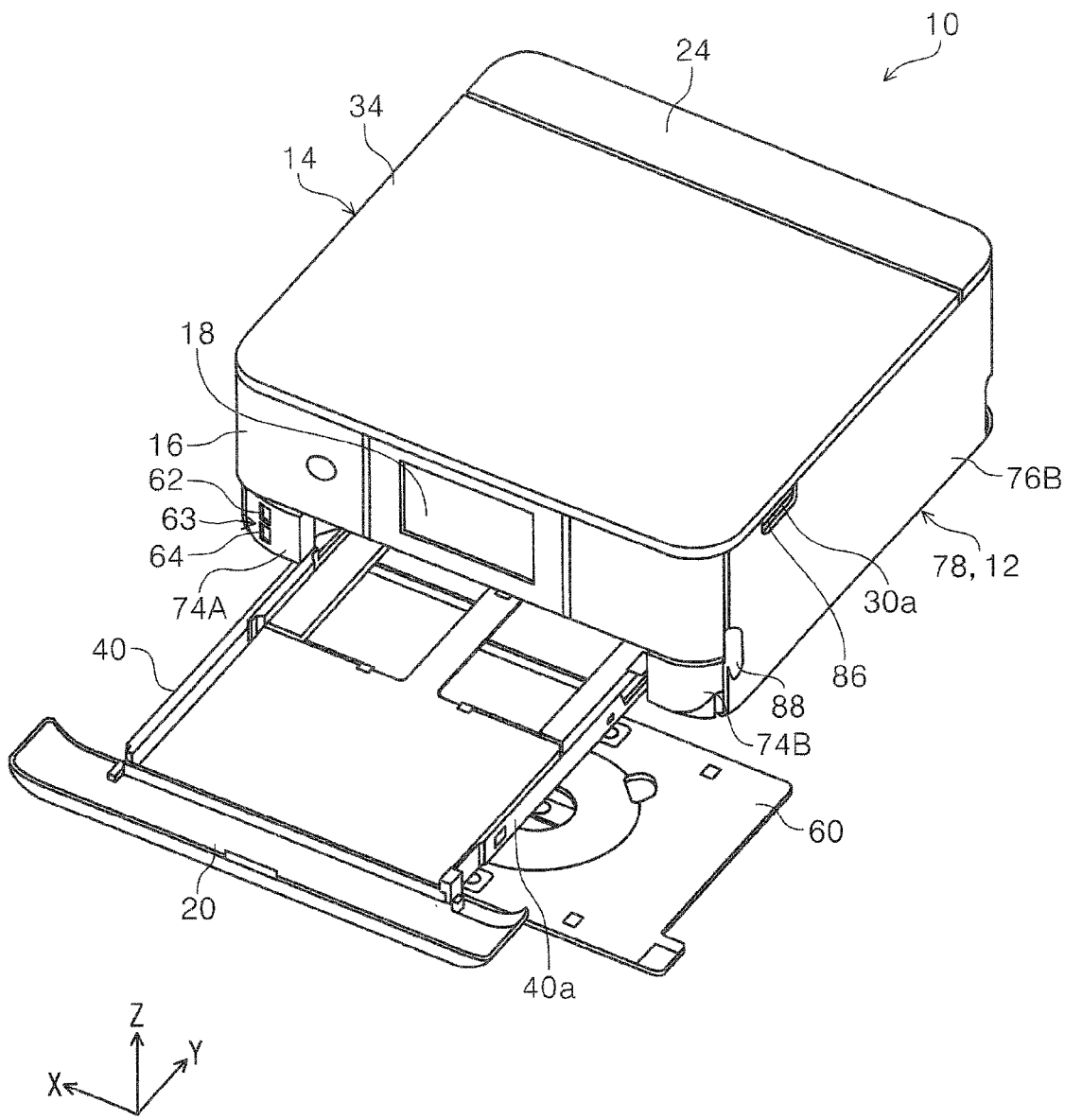
FIG. 8 is a perspective view showing a state in which a tray accommodated in the cassette is pulled out.
Figure 9:
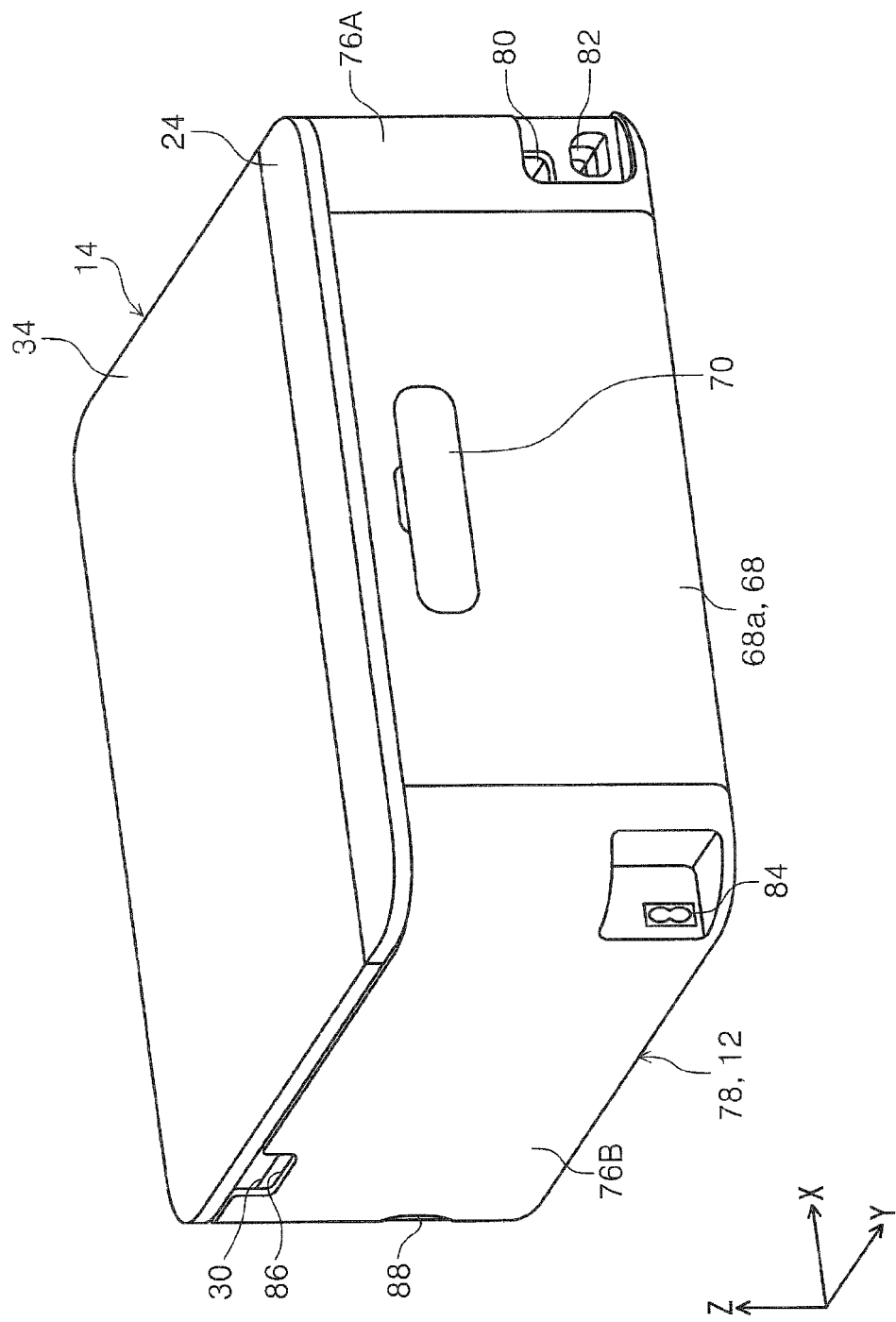
FIG. 9 is a perspective view of the printer according to the invention, as viewed from the rear side.
Figure 10:
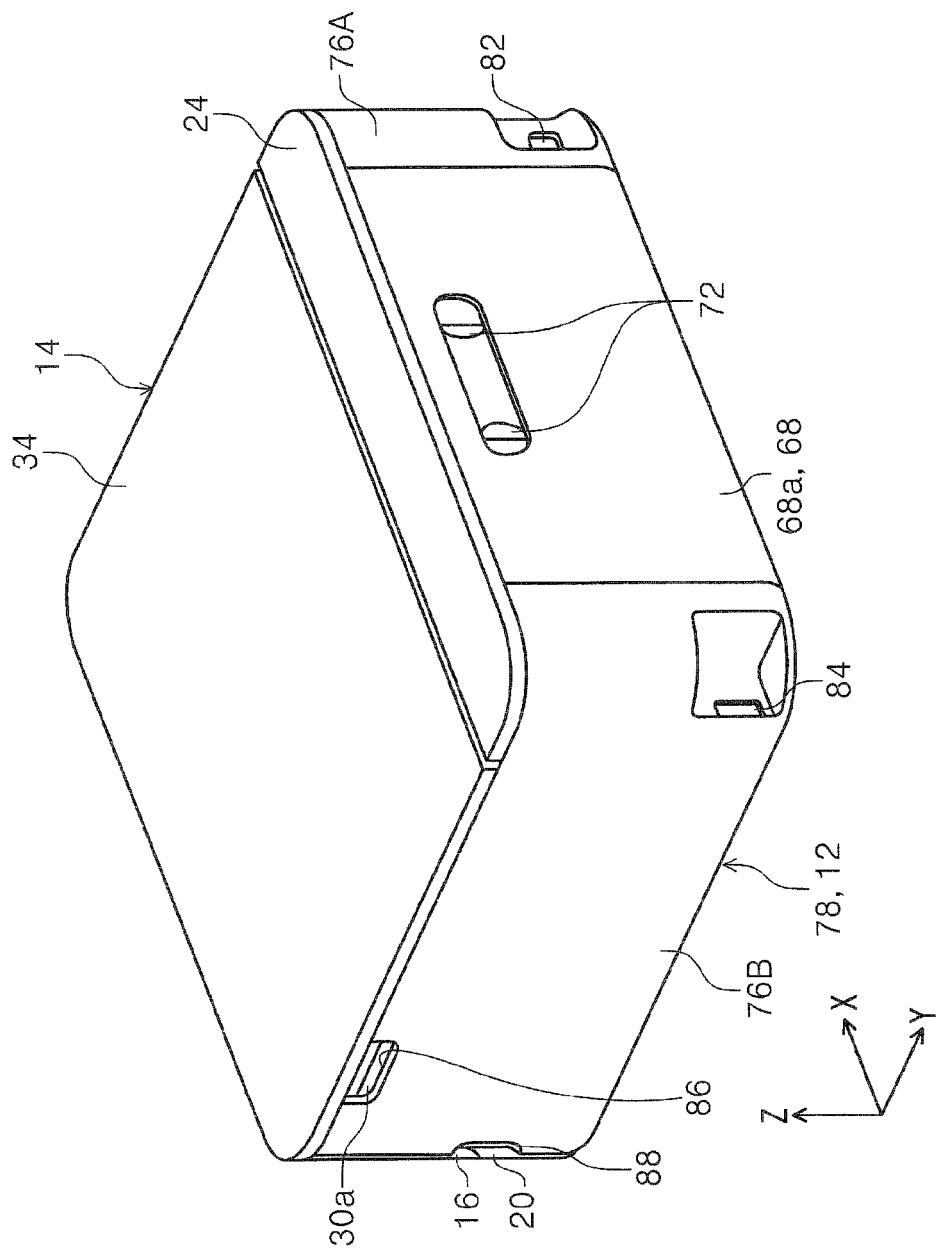
FIG. 10 is a perspective view of the printer according to the invention, showing a state in which unlock levers provided on a unit body are exposed.
Figure 11:
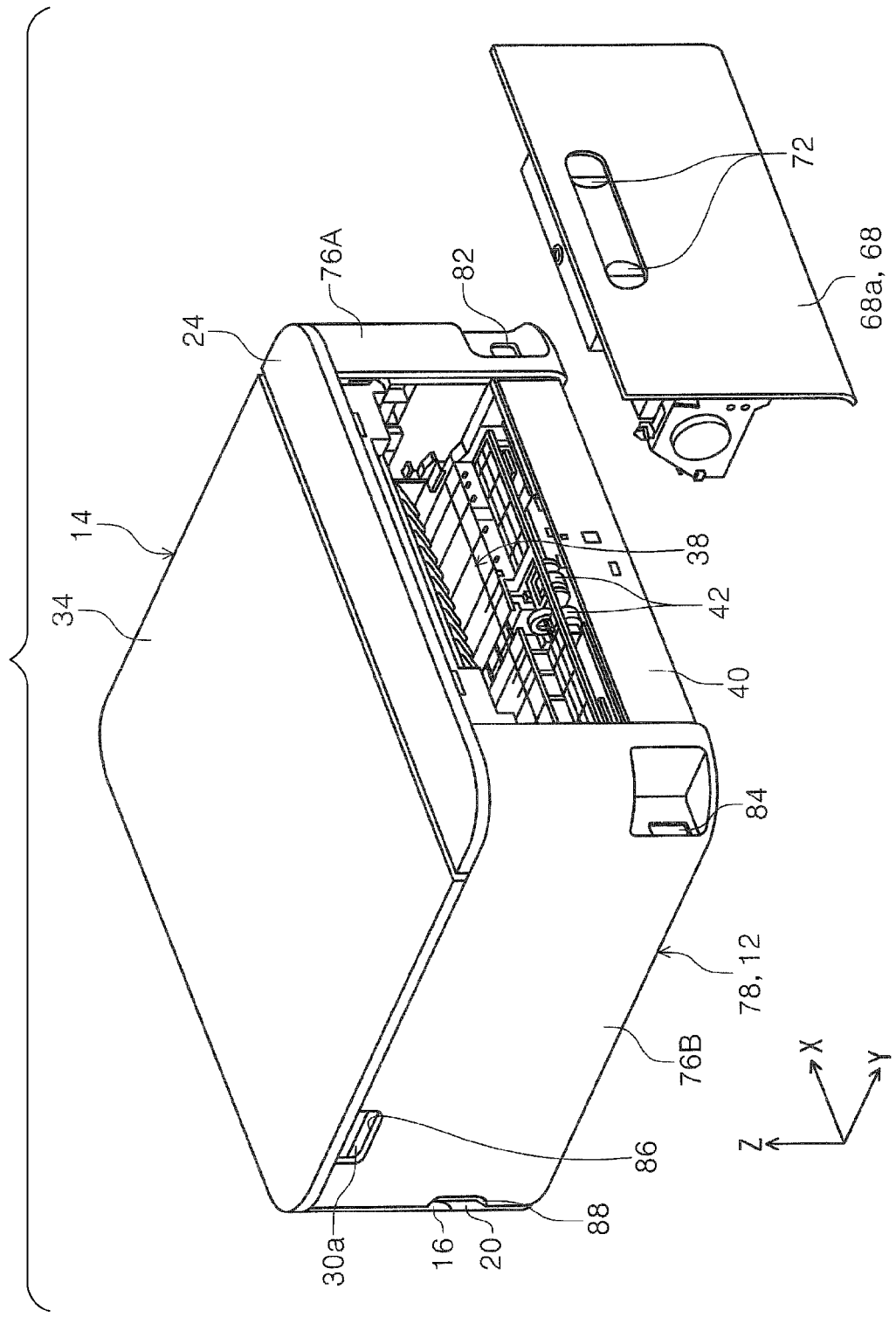
FIG. 11 is a perspective view showing a state in which the unit body is removed from the recording-mechanism unit.
Figure 12:
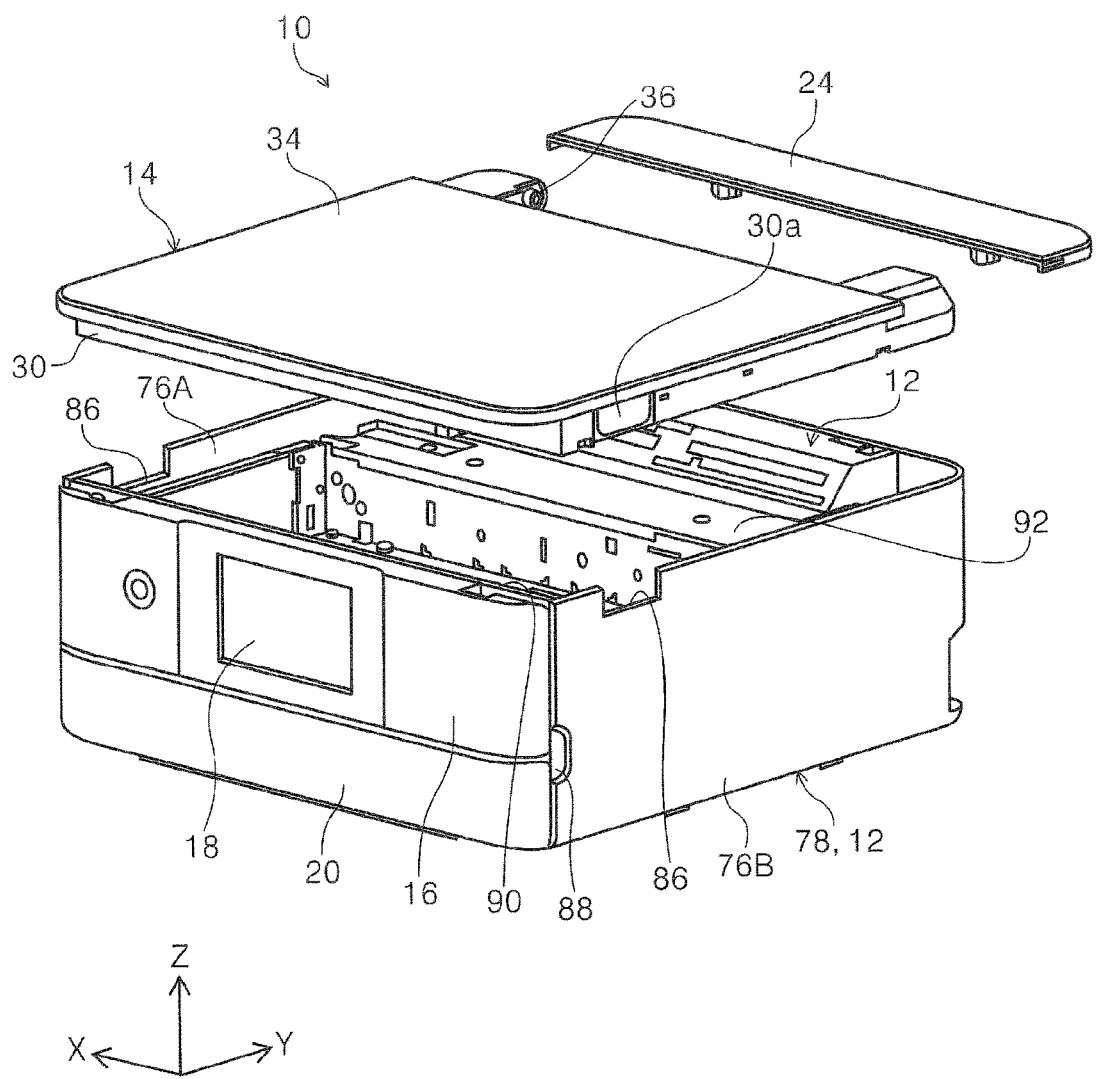
FIG. 12 is an exploded perspective view of the recording-mechanism unit, the scanner unit, and an upper-surface cover.

FIG. 8 is a perspective view showing a state in which a tray accommodated in the cassette is pulled out. FIG. 9 is a perspective view of the printer according to the invention, as viewed from the rear side. FIG. 10 is a perspective view of the printer according to the invention, showing a state in which unlock levers provided on a unit body are exposed. FIG. 11 is a perspective view showing a state in which the unit body is removed from the recording-mechanism unit. FIG. 12 is an exploded perspective view of the recording-mechanism unit, the scanner unit, and an upper-surface cover.

Figure 13:
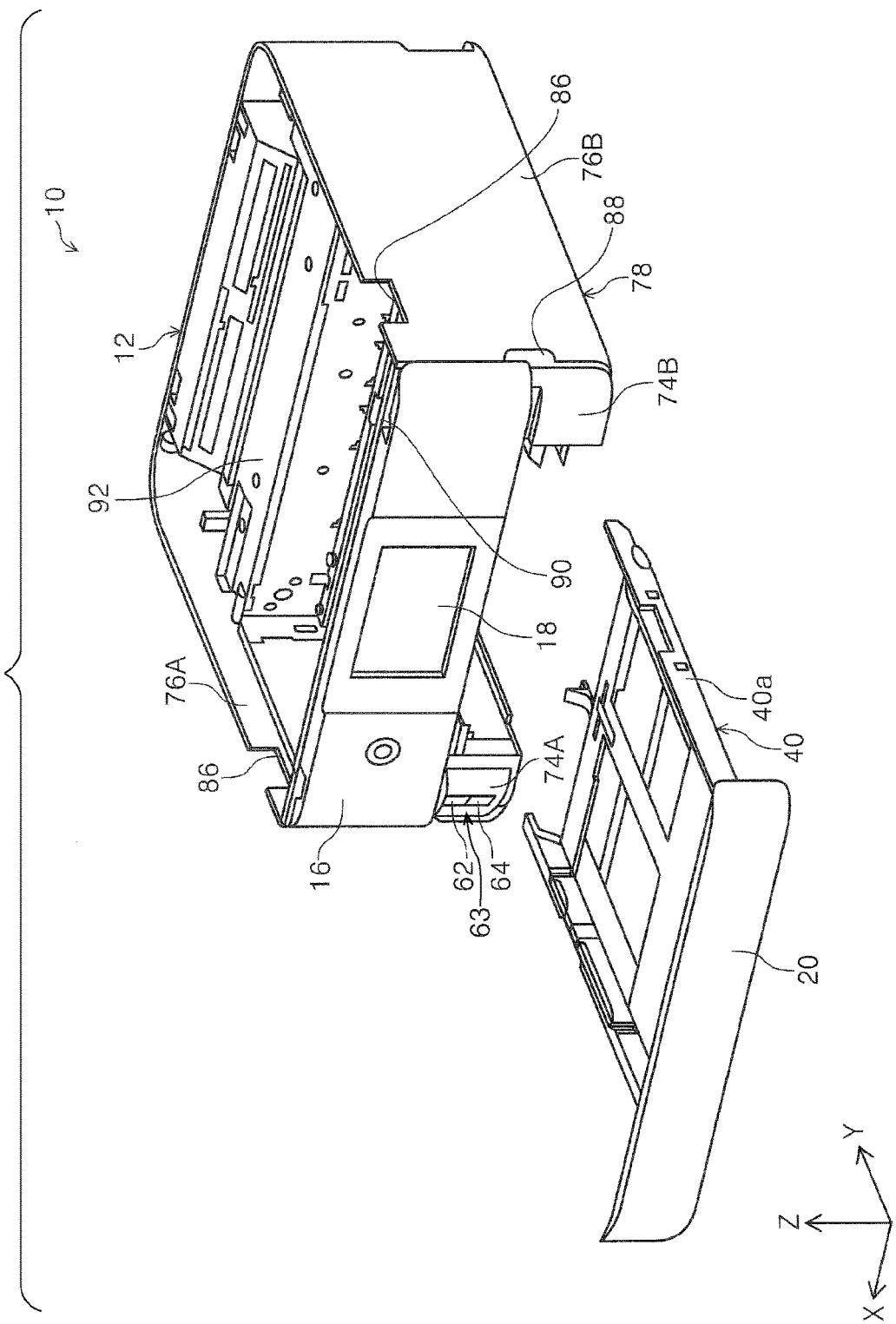
FIG. 13 is an exploded perspective view of the recording-mechanism unit and the cassette.
Figure 14:
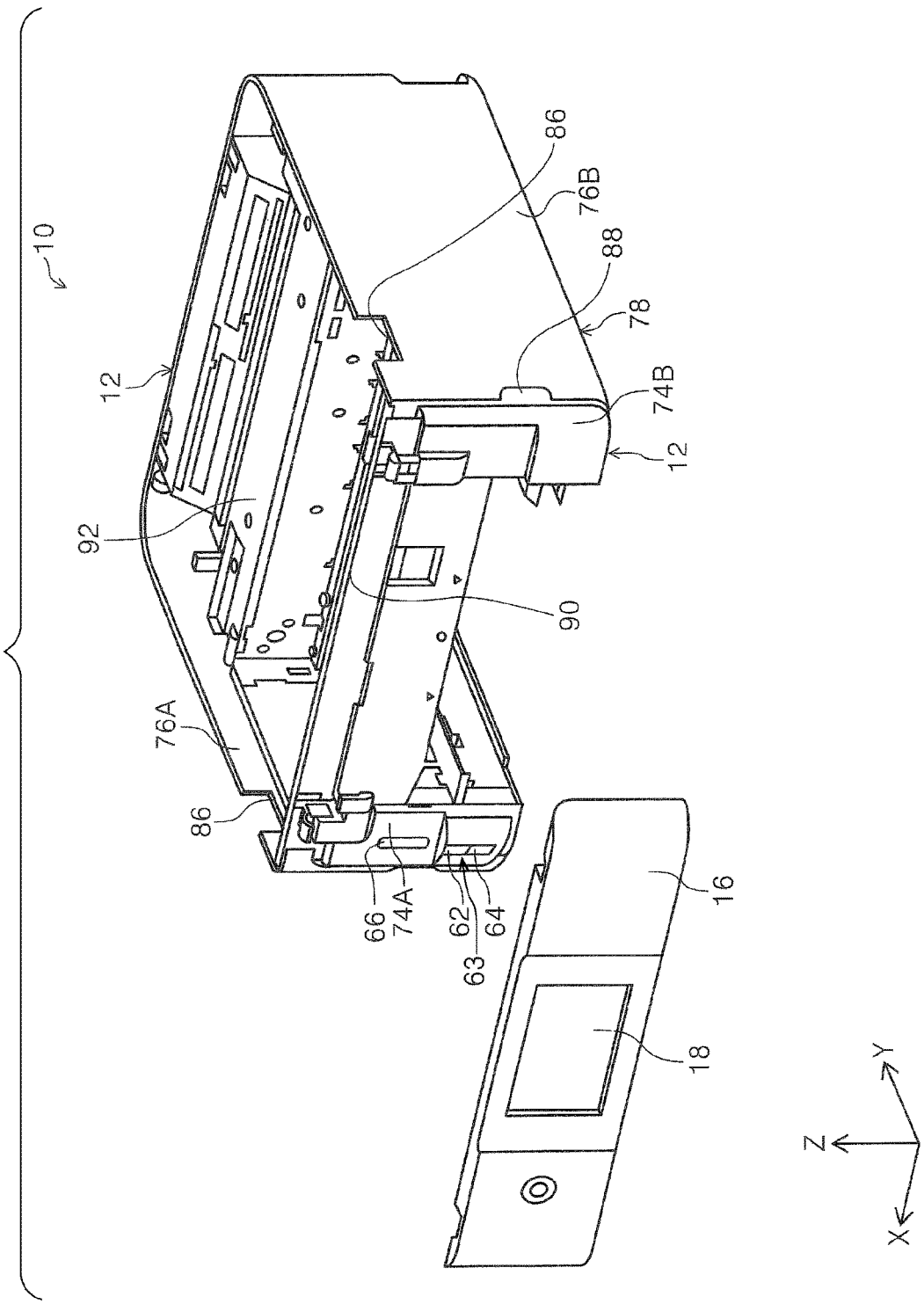
FIG. 14 is an exploded perspective view of the recording-mechanism unit and an operating section.
Figure 15:
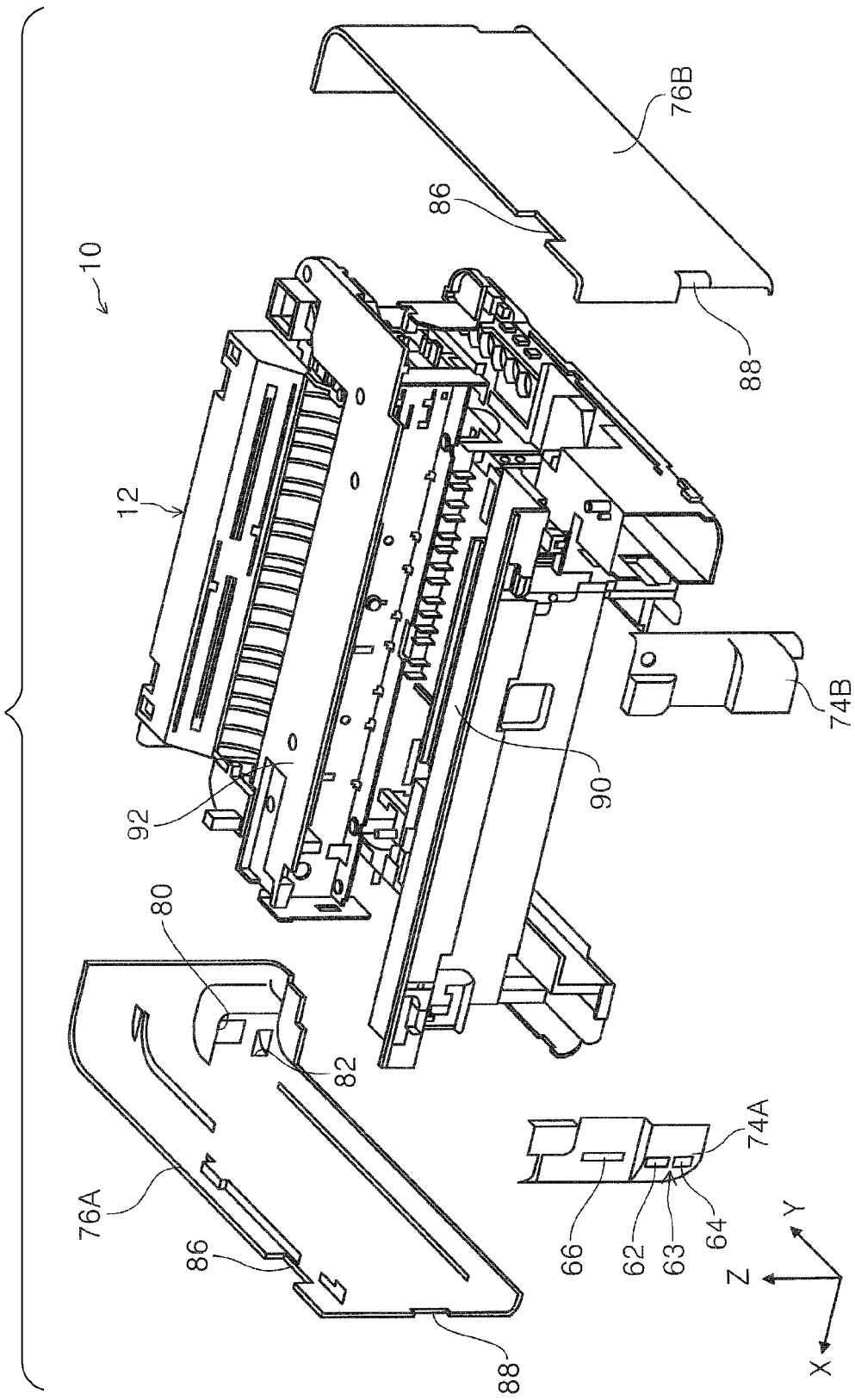
FIG. 15 is an exploded perspective view showing a state in which exterior members are removed from the recording-mechanism unit.
Figure 16:
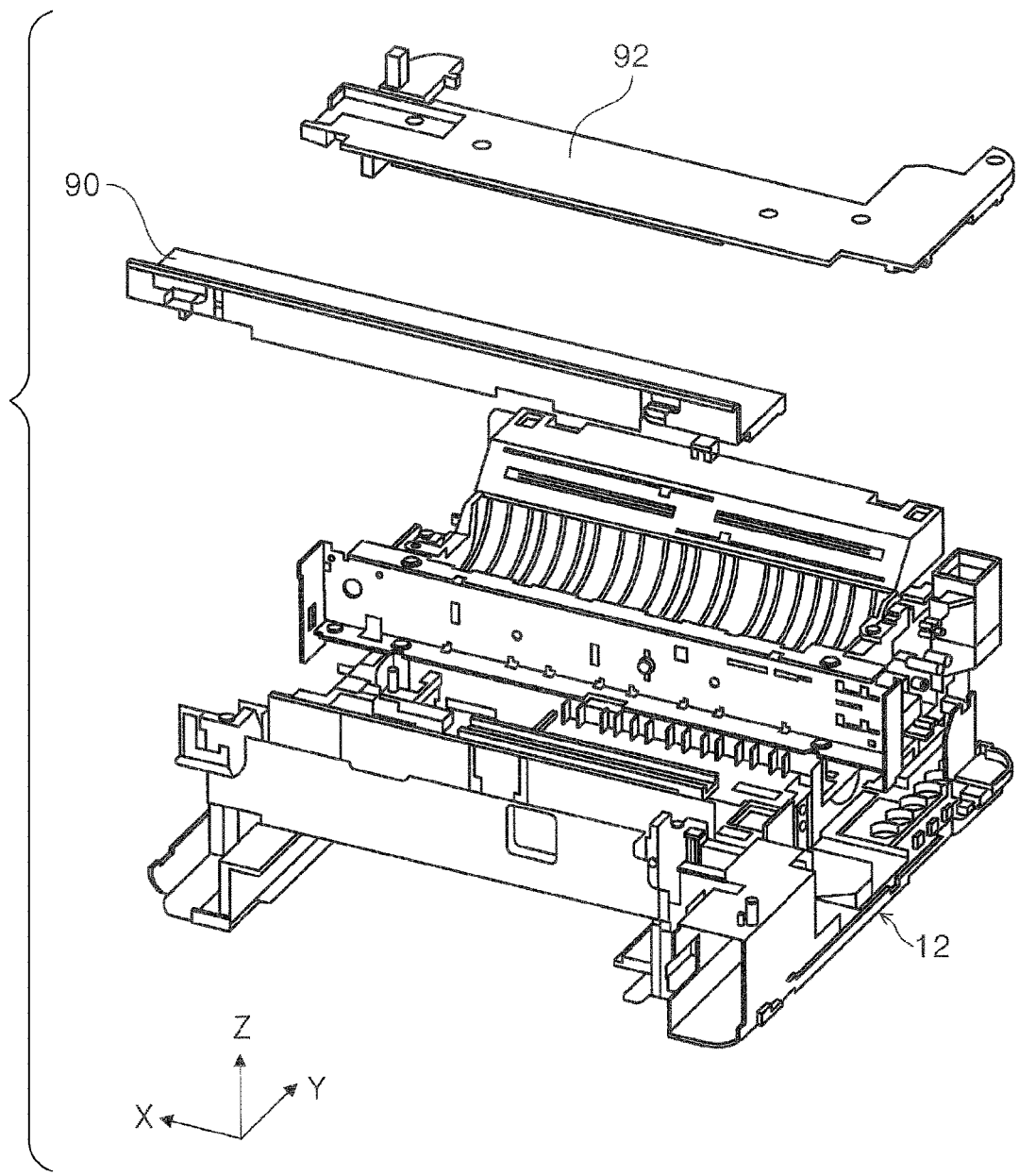
FIG. 16 is an exploded perspective view showing a state in which an upper cover member is removed from the recording-mechanism unit.
Figure 17:
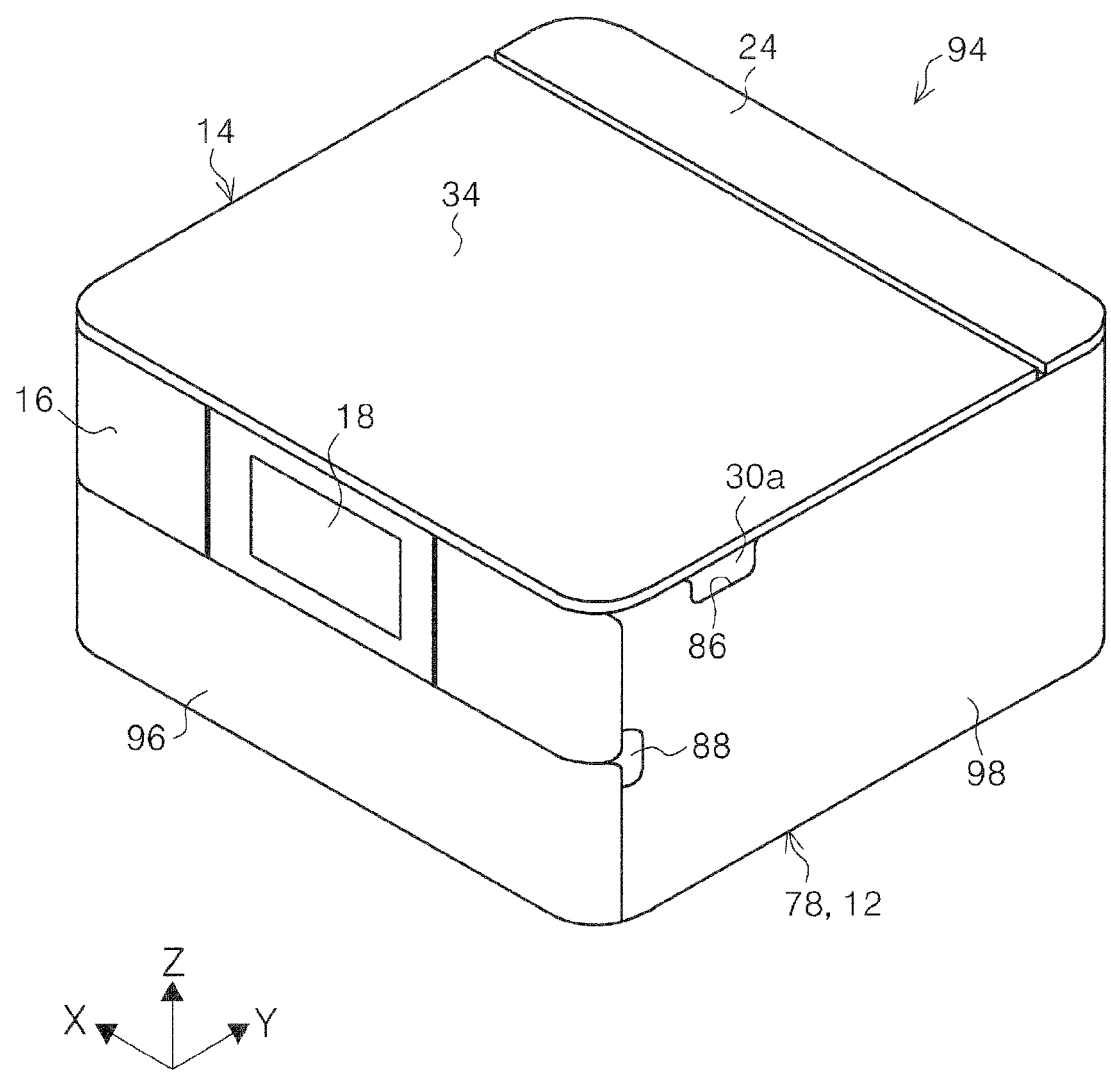
FIG. 17 is an external perspective view showing a modification example in which the heightwise dimension of the printer is changed.
Figure 18:
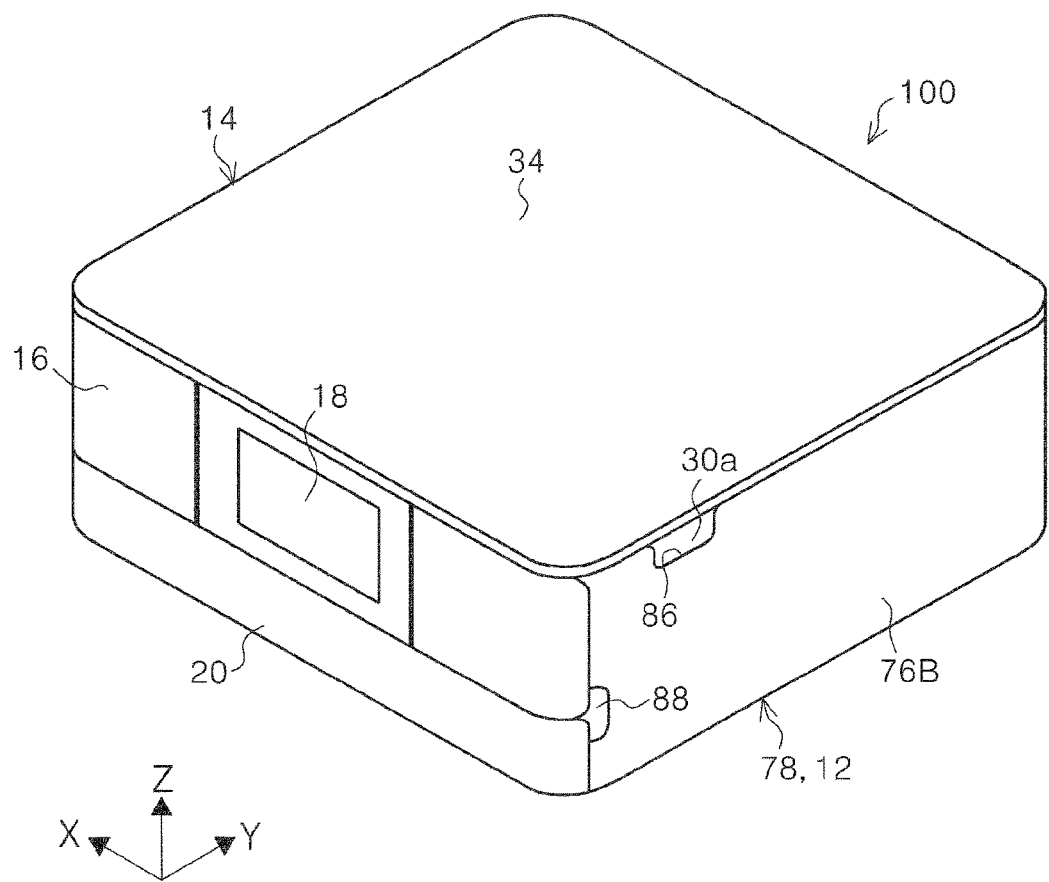
FIG. 18 is an external perspective view showing a modification example in which the top of the printer is covered solely by the document bed cover.

FIG. 13 is an exploded perspective view of the recording-mechanism unit and the cassette. FIG. 14 is an exploded perspective view of the recording-mechanism unit and an operating section. FIG. 15 is an exploded perspective view showing a state in which exterior members are removed from the recording-mechanism unit. FIG. 16 is an exploded perspective view showing a state in which an upper cover member is removed from the recording-mechanism unit. FIG. 17 is an external perspective view showing a modification example in which the heightwise dimension of the printer is changed. FIG. 18 is an external perspective view showing a modification example in which the top of the printer is covered solely by the document bed cover.

In the XYZ coordinate system shown in each drawing, the X direction corresponds to the main scanning direction (moving direction) of a carriage, that is, the width direction of the printer, the Y direction corresponds to the depth direction of the printer, and the Z direction corresponds to the height direction of the printer. In each drawing, the +X direction side corresponds to the left side of the printer, the -X direction side corresponds to the right side of the printer, the -Y direction side corresponds to the front side of the printer, the +Y direction side corresponds to the rear side of the printer, the +Z direction side corresponds to the upper side of the printer, and the -Z direction side corresponds to the lower side of the printer.

Embodiments

Outline of Printer

Referring to FIG. 1, a printer 10 includes a recording-mechanism unit 12 and a scanner unit 14, serving as a "reading-mechanism unit", provided above the recording-mechanism unit 12. An operating section 16 is provided at the front side of the recording-mechanism unit 12 so as to be pivotable (tiltable) relative to the recording-mechanism unit 12. More specifically, the operating section 16 is switchable between a closed orientation with respect to the recording-mechanism unit 12 (see FIG. 1) and an orientation in which it is pivoted to the front side of the printer relative to the recording-mechanism unit 12 (see FIG. 2). The operating section 16 is provided with a display 18, such as a display panel.

A front-surface cover 20 is disposed below the operating section 16, at the front side of the recording-mechanism unit 12. Furthermore, the recording-mechanism unit 12 is provided with a sheet output tray 22. The sheet output tray 22 is switchable between a state in which it is accommodated in the recording-mechanism unit 12 (see FIG. 1) and a state in which it is drawn to the front side of the recording-mechanism unit 12 (see FIG. 2).

Furthermore, an upper-surface cover 24 is pivotably attached to a rear-side portion of the top of the recording-mechanism unit 12. The upper-surface cover 24 is switchable between a closed state with respect to the recording-mechanism unit 12, as shown in FIG. 1, and an open state with respect to the recording-mechanism unit 12, as shown in FIG. 2. When the upper-surface cover 24 is opened with respect to the recording-mechanism unit 12, a set port 26, into which a recording medium is set, is exposed at the rear-side portion of the top of the recording-mechanism unit 12. This enables a recording medium to be inserted into the set port 26 in the direction of arrow A, and the medium inserted into the set port 26 is guided by a sloping medium-guide path 28 shown in FIG. 3 and is transported to the downstream side in the transport direction.

In this embodiment, as shown in FIG. 1, the upper-surface cover 24 has a width equivalent to the lateral width (i.e., the widthwise dimension) of the recording-mechanism unit 12. Specifically, in a closed state with respect to the recording-mechanism unit 12, the upper-surface cover 24 constitutes a portion of the upper surface, that is, in this embodiment, a depthwise rear-side portion of the upper surface of the recording-mechanism unit 12.

Scanner Unit

As shown in FIGS. 3 and 4, the scanner unit 14 is provided on the recording-mechanism unit 12. The scanner unit 14 includes a main body section 30 (see FIG. 6), a document bed 32 (see FIG. 6) provided on the main body section 30, and a document bed cover 34, serving as an "opening/closing body". The document bed 32 is formed of, for example, a transparent glass plate and can support a document mounted on the upper surface thereof.

The document bed cover 34 is pivotably joined to the main body section 30. In other words, the document bed cover 34 covers and uncovers the document bed 32 by pivoting. In a closed state (see FIGS. 1 and 2), the document bed cover 34 covers the document bed 32, and, in an open state (see FIG. 4), the document bed cover 34 exposes the document bed 32. In this embodiment, the document bed cover 34 closed with respect to the document bed 32 constitutes a depthwise front-side portion of the upper surface of the printer 10.

By pivoting and opening the document bed cover 34 with respect to the document bed 32 to expose the document bed 32, mounting a document on the upper surface of the document bed 32, and closing the document bed cover 34, reading of the document on the document bed 32 becomes possible. A reading unit (not shown) that can read the document mounted on the document bed 32 is provided below the document bed 32, that is, inside the main body section 30.

In this embodiment, the scanner unit 14 is provided with a pivot shaft 36 (see FIG. 12) at a depthwise rear-side portion of the main body section 30. The scanner unit 14 is pivotably joined to the recording-mechanism unit 12 via the pivot shaft 36. The scanner unit 14 is switchable between a closed orientation with respect to the recording-mechanism unit 12 (see FIGS. 1 and 2) and an orientation in which it is pivoted and opened with respect to the recording-mechanism unit 12 (see FIG. 5).

Referring to FIG. 5, the main body section 30 of the scanner unit 14 is provided with recessed portions 30a at depthwise front-side portions of the widthwise ends. In this embodiment, the recessed portions 30a have such a size that they receive user's fingers when the user lifts up and pivots the scanner unit 14 with respect to the recording-mechanism unit 12.

In this embodiment, as shown in FIG. 6, the main body section 30 includes an upper case 30b and a lower case 30c. The recessed portions 30a are provided in the upper case 30b. In this embodiment, as shown in FIG. 4, when the document bed cover 34 is opened with respect to the document bed 32, the upper case 30b is also exposed with the document bed 32. In this embodiment, the lower case 30c is covered in a housing 78 (described below) of the recording-mechanism unit 12.

Variations of the printer 10 may be produced by changing, for example, the colors of the upper-surface cover 24, the document bed cover 34, side-surface exterior members 76A and 76B, and the upper case 30b.

Referring to FIG. 4, in this embodiment, the recessed portions 30a are exposed through cutout portions 86 provided in the side-surface exterior members 76A and 76B. If the color of the recessed portions 30a is different from the color of the side-surface exterior members 76A and 76B, the uniformity in the appearance of the exterior of the printer is deteriorated. In this embodiment, because the recessed portions 30a are provided in the upper case 30b, it is easy to make the color of the recessed portions 30a the same as the color of the side-surface exterior members 76A and 76B. As a result, it is possible to provide uniformity to the appearance of the exterior of the printer 10.

Furthermore, in this embodiment, even if variations of the printer 10 are produced by changing the colors of the side-surface exterior members 76A and 76B and the upper case 30b of the recording-mechanism unit 12, the color of the lower case 30c does not need to be changed, and thus, common components can be used.

Medium Transport Path

Next, referring to FIG. 3, a medium transport path 38 in the recording-mechanism unit 12, along which a recording medium is transported, will be described. In FIG. 3, a bold solid line denoted by reference sign P shows a guide path along which a medium is transported from a cassette 40 to the sheet output tray 22 along the medium transport path 38.

The cassette 40 for storing a recording medium is provided at the lower part of the recording-mechanism unit 12. The cassette 40 is formed in a box shape and can accommodate a recording medium therein. Furthermore, a pickup roller 42, a reversing roller 44, driven rollers 46a, 46b, and 46c, a transport roller pair 48, a recording section 50, and a discharge roller pair 52 are provided in the recording-mechanism unit 12, in this order along the medium transport path 38. The pickup roller 42 is disposed above the cassette 40 so as to be pivotable about a pivot shaft 53. A recording medium fed from the cassette 40 by the pickup roller 42 is nipped between the reversing roller 44 and the driven rollers 46a and 46b and is transported to the transport roller pair 48.

The transport roller pair 48 transports the recording medium to the recording section 50. In this embodiment, the recording section 50 includes a carriage 54, a recording head 56, serving as a "recording device", and a medium guide member 58. In this embodiment, the carriage 54 can reciprocate widthwise. The recording head 56 is provided below the carriage 54. In this embodiment, the recording head 56 discharges ink to the heightwise lower side.

The medium guide member 58 is provided in a region below and facing the recording head 56. The medium guide member 58 is disposed away from and facing the recording head 56. The medium guide member 58 supports the lower surface (i.e., the surface opposite to the recording surface) of the recording medium transported by the transport roller pair 48 to the region where the medium guide member 58 faces the recording head 56. The recording head 56 discharges ink at the recording medium supported by the medium guide member 58, thereby performing recording on the recording surface of the recording medium.

The recording medium having been subjected to recording is nipped by the discharge roller pair 52 provided on the downstream side of the recording section 50 in the transport direction and is discharged onto the sheet output tray 22 projecting to the front side of the printer.

A recording medium inserted into the set port 26 from the top of the printer 10 by opening the upper-surface cover 24 is guided by the medium-guide path 28 and is transported to the recording section 50, where it is subjected to recording. After the recording is performed, the recording medium is discharged onto the sheet output tray 22.

After recording is performed on a first surface (recording surface) of the recording medium in the recording section 50, if recording is performed on a second surface (lower surface) opposite to the first surface, the transport roller pair 48 is rotated reversely to transport the recording medium upstream in the transport direction. The recording medium transported upstream in the transport direction is nipped between the reversing roller 44 and the driven roller 46c. The recording medium is reversed (i.e., the first surface and the second surface thereof are switched) by the reversing roller 44 and is transported to the recording section 50 again, where recording on the second surface is performed. Then, the recording medium is discharged onto the sheet output tray 22.

Cassette

Referring to FIGS. 1, 7, and 8, the cassette 40 is provided at the lower part of the recording-mechanism unit 12 so as to be attachable to and removable from the recording-mechanism unit 12. The front-surface cover 20 is attached to the depthwise front side of the cassette 40 so as to be pivotable with respect to the cassette 40.

In this embodiment, the cassette 40 accommodates a tray 60 (see FIG. 8) at the lower part of the cassette 40. The tray 60 can be drawn widthwise from a side portion 40a of the cassette 40, in a state in which the cassette 40 is drawn to the depthwise front side of the recording-mechanism unit 12. The tray 60 can accommodate a circular disc-shaped optical medium. By inserting the tray 60 toward the recording section 50 from the depthwise front side of the printer 10, recording of text, images, etc. on the surface of the circular disc-shaped optical medium can be performed.

As shown in FIGS. 1 and 5, in this embodiment, the front-surface cover 20 has a width equivalent to the lateral width of the recording-mechanism unit 12. Specifically, in a state in which the cassette 40 is attached to the recording-mechanism unit 12, when the front-surface cover 20 is closed with respect to the cassette 40, the front-surface cover 20 constitutes a portion of the front surface of the recording-mechanism unit 12, that is, in this embodiment, the lower part of the front surface of the recording-mechanism unit 12.

In this embodiment, in a state in which the cassette 40 is attached to the recording-mechanism unit 12, when the front-surface cover 20 is opened with respect to the cassette 40, an interface section 63 (see FIGS. 7 and 8) provided at the widthwise left end is exposed. In this embodiment, for example, the interface section 63 includes an infrared communication window (port) 62 and an external-device connecting port 64. When the front-surface cover 20 is opened, the infrared communication window 62 becomes communicable. In this embodiment, for example, the external-device connecting port 64 is configured as a USB-terminal connecting port. By opening the front-surface cover 20, a USB terminal can be connected to the external-device connecting port 64.

In a state in which the cassette 40 is attached to the recording-mechanism unit 12, when the front-surface cover 20 is closed with respect to the cassette 40, the infrared communication window 62 and the external-device connecting port 64 are covered by the front-surface cover 20. In other words, in this embodiment, because there is no need to separately provide a cover for the infrared communication window 62 and the external-device connecting port 64, the number of components can be reduced, and thus, the cost can be reduced. In this embodiment, because the lower part of the front surface of the apparatus is formed of a single component, namely, the front-surface cover 20, a step or a seam is not produced at the front side of the printer, and thus, it is possible to improve the aesthetic appearance of the printer.

Operating Section

The operating section 16 is attached to the depthwise front side of the recording-mechanism unit 12 so as to be pivotable with respect to the recording-mechanism unit 12. In this embodiment, as shown in FIGS. 1 and 5, the operating section 16 has a width equivalent to the lateral width of the recording-mechanism unit 12. Specifically, when the operating section 16 is closed with respect to the recording-mechanism unit 12, the operating section 16 constitutes a portion of the front surface of the recording-mechanism unit 12, that is, in this embodiment, the upper part of the front surface of the recording-mechanism unit 12.

Referring to FIG. 2, when the operating section 16 is opened with respect to the recording-mechanism unit 12, an interface section 66 provided at the widthwise left end is exposed. In this embodiment, for example, the interface section 66 is configured as a slot into which a card-shaped storage medium can be inserted. The interface section 66 does not necessarily have to be formed solely of such a slot, but may also include, for example, an infrared communication port (window), a connecting interface (i.e., a connecting port, such as a USB port) with respect to an external device. Alternatively, the interface section 66 may include any one or a combination of two or more of them. This configuration is common to a printer 94 (see FIG. 17) and a printer 100 (see FIG. 18) described below.

When the operating section 16 that is opened with respect to the recording-mechanism unit 12 is closed, the interface section 66 is covered by the operating section 16 and cannot be seen from the depthwise front side of the recording-mechanism unit 12.

In this embodiment, the operating section 16 has a width equivalent to the lateral width of the recording-mechanism unit 12. In other words, because the upper part of the front surface of the recording-mechanism unit 12 is not formed of a plurality of components, there is no need to improve the component accuracy of the operating section 16 to eliminate a step formed between the plurality of components. Furthermore, when the operating section 16 is closed with respect to the recording-mechanism unit 12, steps are not produced at the widthwise ends of the operating section 16. Hence, it is possible to improve the aesthetic appearance of the printer.

Unit Body

Referring to FIGS. 9 to 11, a unit body 68 that is attachable to and removable from the recording-mechanism unit 12 is attached at the rear side of the recording-mechanism unit 12. In this embodiment, the unit body 68 includes the reversing roller 44 and the driven rollers 46b and 46c. In a state of being attached to the recording-mechanism unit 12, the unit body 68 constitutes a portion of the medium transport path 38.

Referring to FIG. 9, in a state in which the unit body 68 is attached at the rear side of the recording-mechanism unit 12, a rear surface 68a of the unit body 68 constitutes at least a portion of the rear surface of the recording-mechanism unit 12. A cover member 70 is removably attached to the rear surface 68a of the unit body 68. If the cover member 70 is removed from the rear surface 68a, as shown in FIG. 10, a pair of unlock levers 72 are exposed.

In this embodiment, in a state in which the unit body 68 is attached to the recording-mechanism unit 12, if the unlock levers 72 are urged toward each other, that is, toward the widthwise center, the unit body 68 is unlocked from the recording-mechanism unit 12, and, as shown in FIG. 11, the recording-mechanism unit 12 can be removed from the unit body 68. By removing the unit body 68 from the recording-mechanism unit 12, a portion of the medium transport path 38 is exposed, making it easy to fix a paper jam in the medium transport path 38.

Configuration of Recording-Mechanism Unit

Next, referring to FIGS. 12 to 16, the configuration of the recording-mechanism unit 12 will be described. Referring to FIG. 12, in this embodiment, the scanner unit 14 and the upper-surface cover 24 are provided on the recording-mechanism unit 12. In this embodiment, as shown in FIGS. 1 and 9, the upper surface of the printer 10 is formed of the document bed cover 34 of the scanner unit 14 and the upper-surface cover 24.

In this embodiment, in a state in which the document bed cover 34 and the upper-surface cover 24 are closed, the upper surface of the document bed cover 34 and the upper surface of the upper-surface cover 24 are flush with each other, that is, a step is not produced therebetween. As a result, it is possible to suppress formation of projections and depressions in the upper surface of the printer 10 and, hence, to improve the aesthetic appearance of the printer 10.

Referring to FIGS. 13 to 15, by removing the operating section 16 and the cassette 40 from the recording-mechanism unit 12, front-side exterior members 74A and 74B are exposed. In this embodiment, the front-side exterior member 74A is attached to the widthwise left end, at the depthwise front side of the recording-mechanism unit 12. As shown in FIG. 14, the front-side exterior member 74A is provided with the infrared communication window 62, the external-device connecting port 64, and the interface section 66. The front-side exterior member 74B is attached to the widthwise right end, at the depthwise front side of the recording-mechanism unit 12.

Furthermore, the side-surface exterior members 76A and 76B are provided at the widthwise side surfaces of the recording-mechanism unit 12. In this embodiment, the front-side exterior members 74A and 74B and the side-surface exterior members 76A and 76B are attached to the recording-mechanism unit 12 and serve as a housing 78 that constitutes the exterior of the recording-mechanism unit 12.

In this embodiment, the side-surface exterior members 76A and 76B are formed as cover members that cover the widthwise right-side surface and left-side surface of the recording-mechanism unit 12, respectively. More specifically, the side-surface exterior members 76A and 76B extend from the depthwise front side to the depthwise rear side of the recording-mechanism unit 12 and are curved widthwise inward at the rear side thereof.

The side-surface exterior member 76A is provided with openings 80 and 82 in the curved portion at the depthwise rear side. The openings 80 and 82 serve as connecting ports via which external devices and the printer 10 are connected. In this embodiment, for example, the opening 80 is provided with a LAN cable connector, and the opening 82 is provided with a USB cable connector.

The side-surface exterior member 76B is provided with an opening 84 in the curved portion at the depthwise rear side. The opening 84 is provided with a power-supply connector to which a power-supply plug, via which power is supplied to the printer 10 from an external power supply, is connected.

The cutout portions 86 are provided in the upper ends of the side-surface exterior members 76A and 76B. In this embodiment, the cutout portions 86 are provided at depthwise front-side portions of the side-surface exterior members 76A and 76B.

Referring to FIGS. 1 and 2, in this embodiment, in a state in which the scanner unit 14 is closed with respect to the recording-mechanism unit 12, portions of the main body section 30 of the scanner unit 14 are exposed through the cutout portions 86 provided in the side-surface exterior members 76A and 76B. In this embodiment, recessed portions 30a are formed at the exposed portions of the main body section 30. Hence, in a state in which the scanner unit 14 is closed with respect to the recording-mechanism unit 12, the recessed portions 30a are exposed through the cutout portions 86, and user's fingers can be inserted therein.

In this embodiment, when the scanner unit 14 is pivoted, because a user inserts his/her fingers into the recessed portions 30a at positions away, toward the depthwise front side, from the pivot shaft 36 (see FIG. 12) of the scanner unit 14 to lift up the scanner unit 14, it is possible to pivot the scanner unit 14 with a smaller force.

Referring to FIGS. 1 and 5, in a state in which the scanner unit 14 is closed with respect to the recording-mechanism unit 12, at least the main body section 30 of the scanner unit 14 is accommodated inside the housing 78, which is formed of the front-side exterior members 74A and 74B and the side-surface exterior members 76A and 76B.

The side-surface exterior members 76A and 76B are further provided with recessed portions 88 at the front ends.

In this embodiment, the recessed portions 88 are provided at positions corresponding to the heightwise boundary between the operating section 16 and the front-surface cover 20. In a state in which the operating section 16 and the front-surface cover 20 are closed, by inserting fingers into the recessed portions 88 and pushing the operating section 16 and the front-surface cover 20, the operating section 16 and the front-surface cover 20 can be easily opened.

In this embodiment, the side-surface exterior members 76A and 76B each cover, by a single component, a corresponding one of the right-side surface and the left-side surface of the recording-mechanism unit 12. Hence, unlike the case where the right-side surface and the left-side surface of the recording-mechanism unit are each covered by a plurality of components, there are no boundary lines, and thus, it is possible to improve the aesthetic appearance of the side surfaces of the recording-mechanism unit 12, and consequently, the printer 10.

Referring to FIG. 16, a front-side upper cover 90 and a rear-side upper cover 92 are attached to portions of the recording-mechanism unit 12, the portions facing the lower part of the main body section 30 when the scanner unit 14 is closed (see FIG. 1).

Referring to FIGS. 3 and 5, in this embodiment, the heights of the upper surface of the front-side upper cover 90 and the upper surface of the rear-side upper cover 92 in the recording-mechanism unit 12 are set to be substantially the same. In other words, the upper surface of the front-side upper cover 90 and the upper surface of the rear-side upper cover 92 are set to be flush with each other. With this configuration, it is possible to reduce the number of projections and depressions inside the recording-mechanism unit 12 viewed by a user when the scanner unit 14 is pivoted with respect to the recording-mechanism unit 12 and the inside of the recording-mechanism unit 12 is exposed and, thus, to improve the aesthetic appearance of the printer 10.

Modification Example of Embodiment (1) In this embodiment, although the printer 10 is configured such that the scanner unit 14 is provided on the recording-mechanism unit 12, instead, the printer 10 may have solely a printer function, without providing the scanner unit 14.

(2) Furthermore, the heightwise dimension of the printer 10 may be changed. FIG. 17 shows the printer 94 having an increased heightwise dimension. In this embodiment, the heightwise dimension of the housing 78 of the printer 94 can be changed by making the heightwise dimensions of a front-surface cover 96 and side-surface exterior members 98 larger than the heightwise dimensions of the front-surface cover 20 and the side-surface exterior members 76A and 76B. In other words, solely by changing the front-surface cover 20 and the side-surface exterior members 76A and 76B, the heightwise dimensions of the housing 78 of the printer 94 can be changed. This way of changing the dimension is applicable to, for example, a design change for increasing the number of sheets accommodated in the cassette 40.

(3) In this embodiment, although the upper-surface cover 24 and the document bed cover 34 are pivotably attached to the top of the printer 10, instead, as shown in FIG. 18, the top of the printer 100 may be covered solely by the document bed cover 34.

(4) In this embodiment, as shown in FIGS. 1 and 2, although the front-surface cover 20 covers the interface section 63 provided at the lower part of the front-side exterior member 74A, and the interface section 63 is formed of the infrared communication window 62 and the external-device connecting port 64, this is merely an embodiment, and the interface section 63 may be formed of, for example, a slot into which a card-shaped storage medium can be inserted or may include any one or a combination of two or more of the slot, an infrared communication port (window), a connecting interface (i.e., a connecting port, such as a USB port) with respect to an external device, and the like. This configuration is common to the printer 94 (see FIG. 17) and the printer 100 (see FIG. 18).

In summary, the printers 10, 94, and 100 each include: the recording-mechanism unit 12 that is provided with the recording head 56 for performing recording on a recording medium; and the scanner unit 14 that reads a document and covers and uncovers the top of the recording-mechanism unit 12 by being pivoted relative to the recording-mechanism unit 12 at the top of the recording-mechanism unit 12. The scanner unit 14 includes the main body section 30 having the document bed 32, on which the document is mounted, and the document bed cover 34 that covers and uncovers the document bed 32. In a state in which the scanner unit 14 is closed, at least the main body section 30 is accommodated inside the housing 78 of the recording-mechanism unit 12.

With this configuration, in a state in which the scanner unit 14 is closed, because at least the main body section 30 of the scanner unit 14 is accommodated inside the housing 78 of the recording-mechanism unit 12, even if the component accuracy of the lower edge of the scanner unit 14 and the upper edge of the housing 78 of the recording-mechanism unit 12 is low, such inaccuracy is unlikely to be noticed from the outside, and the entrance of dust or the like into the interior of the printers 10, 94, and 100 (i.e., into the interior of the recording-mechanism unit) can be suppressed. Consequently, it is possible to suppress an increase in the cost of the housing 78.

The side-surface exterior members 76A and 76B constituting the side surfaces of the housing 78 are provided with the cutout portions 86, through which portions of the side surfaces of the main body section 30 are exposed. This configuration enables a user to hook his/her fingers into the recesses in the side surfaces of the main body section 30 when opening the scanner unit 14 (main body section 30), and thus, the operability is improved.

The portions of the side surfaces of the main body section 30 exposed through the cutout portions 86 are formed as the recessed portions 30a. This configuration enables a user to more easily hook his/her fingers into the recesses in the side surfaces of the main body section 30, and thus, the operability is improved.

The pivot shaft 36 of the scanner unit 14 is provided at a rear-side portion, and the cutout portions 86 are provided at front-side portions of the side surfaces of the recording-mechanism unit 12. This configuration enables the scanner unit 14 (main body section 30) to be opened with a smaller force.

The printers 10, 94, and 100 each include the recording head 56 for performing recording on a recording medium, and the tiltable operating section 16 provided at the front side of the printers 10, 94, and 100. The operating section 16 has a width equivalent to the lateral width of the printers 10, 94, and 100.

With this configuration, because the operating section 16 has a width equivalent to the lateral width of the printers 10, 94, and 100, it is possible to avoid, without improving the component accuracy, a problem of steps being produced at the left and right sides of the operating section 16 in a closed state and, consequently, to suppress an increase in cost.

The printers 10, 94, and 100 each have, at the front side thereof, the interface section 66 into which a storage medium is inserted. The interface section 66 is covered by closing the operating section 16 and is exposed by opening the operating section 16. Because this configuration does not require a dedicated cover for covering and uncovering the interface section 66, the cost can be reduced.

The printers 10, 94, and 100 each include the recording head 56 for performing recording on a recording medium, and the cassette 40 that accommodates a recording medium and can be pulled out from the front side. The cassette 40 includes the front-surface cover 20 that covers and uncovers at least a portion of the front surfaces of the printers 10, 94, and 100, and the front-surface cover 20 has a width equivalent to the lateral width of the printers 10, 94, and 100.

With this configuration, because the cassette 40 includes the front-surface cover 20 that covers and uncovers the front surfaces of the printers 10, 94, and 100, and because the front-surface cover 20 has a width equivalent to the lateral width of the printers 10, 94, and 100, it is possible to avoid, without improving the component accuracy, a problem of steps being produced at the left and right sides of the front-surface cover 20 in a closed state and, consequently, to suppress an increase in cost.

The printers 10, 94, and 100 each include, at a rear-side portion of the top thereof, the set port 26 into which a recording medium is set, and the upper-surface cover 24 that covers the set port 26. The upper-surface cover 24 has a width equivalent to the lateral width of the printers 10, 94, and 100. With this configuration, it is possible to avoid a problem of steps being produced at the left and right sides of the upper-surface cover 24 in a closed state and, consequently, to suppress an increase in cost.

The printers 10, 94, and 100 each include, at the upper part thereof, the scanner unit 14 that reads a document. The scanner unit 14 includes the document bed cover 34 that covers and uncovers the document bed 32 on which a document is mounted. The upper surface of the document bed cover 34 and the upper surface of the upper-surface cover 24 are formed to be flush with each other. This configuration improves the aesthetic appearance of the printers 10, 94, and 100.

The printers 10, 94, and 100 each include the interface section 63 at the front side thereof. The interface section 63 is covered by closing the front-surface cover 20 and is exposed by opening the front-surface cover 20. Because this configuration does not require a dedicated cover for covering and uncovering the interface section 63, the cost can be reduced.

In this embodiment, although the housing 78 of the invention is applied to an ink jet printer, which is an example recording apparatus, it may be applied to other general liquid ejecting apparatuses. Examples of such liquid ejecting apparatuses include not only recording apparatuses, such as printers, copiers, and facsimiles, that use an ink jet recording head and perform recording on a recording medium by discharging ink from the recording head, but also apparatuses that eject a liquid according to the purpose, instead of ink, from a liquid ejecting head, which corresponds to the above-described ink jet recording head, to a medium, which corresponds to the recording medium, to deposit the liquid on the medium.

Examples of such liquid ejecting heads other than the above-described recording head include: colorant ejecting heads used for producing color filters in liquid crystal displays; electrode-material (conductive paste) ejecting heads used for forming electrodes in organic EL displays and field emission displays (FED); living-organic-material ejecting heads used for producing biochips; and sample ejecting heads used as precision pipettes.

It is of course to be understood that the invention is not limited to the above-described embodiments, but may be variously modified within the scope of the invention described in the claims, and such modifications are also included in the invention.

The entire disclosure of Japanese Patent Application No. 2016-035339, filed Feb. 26, 2016 is expressly incorporated by reference herein.

What is claimed is:

1. A recording apparatus comprising:
   a housing including a recording-mechanism unit provided with a recording device that performs recording on a recording medium, peripheral walls of the housing being formed of a panel section, side-surface sections, and a rear-surface section; and
   a reading-mechanism unit that reads a document and covers and uncovers the top of the housing by being pivoted relative to the housing at the top of the housing, the reading-mechanism unit including:
      a main body section having a document bed on which a document is mounted; and
      an opening/closing body that covers and uncovers the document bed and has side surfaces, at least the main body section being accommodated in an interior of the peripheral walls of the housing and the opening/closing body being projected upwardly from the peripheral walls of the housing when the reading-mechanism unit is situated in a closed position so as to cover the top of the housing, each of the side surfaces of the opening/closing body and a corresponding one of the panel section and the side-surface sections being continuous with each other to form a single plane vertically.

2. The recording apparatus according to claim 1, further comprising, at a rear-side portion of the top of the recording apparatus:
   a set port into which a recording medium is set; and
   an upper-surface cover that covers the set port,
   wherein the upper-surface cover has a completely same width as a lateral width of the recording apparatus.

3. The recording apparatus according to claim 2, wherein an upper surface of the opening/closing body and an upper surface of the upper-surface cover form a single plane at a height position.

4. The recording apparatus according to claim 2, wherein the upper-surface cover has side surfaces, and wherein each of the side surfaces of the upper-surface cover and a corresponding one of the side-surface sections are continuous with each other to form a single plane at a vertical direction.

5. The recording apparatus according to claim 1, wherein the side surface sections of the housing have cutout portions, through which portions of the side surfaces of the main body section are exposed.

6. The recording apparatus according to claim 5, wherein the portions of the side surfaces of the main body section exposed through the cutout portions have a recessed shape.

7. The recording apparatus according to claim 6, wherein recessed portions having a recessed shape are recessed toward an inside of the main body section, and the cutout portions are provided in the side surfaces of the recording-mechanism unit, at positions closer to the front side of the recording apparatus than a center of the recording apparatus.

8. A recording apparatus comprising:
   a recording device that performs recording on a recording medium;
   a housing that includes the recording device, the housing being formed of a front-surface section, two side-surface sections, and a rear-surface section, wherein the front and rear surface sections are disposed between the two side-surface sections; and
   a tiltable operating section provided at the front-surface sections of the recording apparatus and extending from a first one of the side-surface sections to a second one of the side-surface sections such that the tiltable operating section has a completely same width as a lateral width of the recording apparatus.

9. The recording apparatus according to claim 8, further comprising an interface section provided at the front-surface section thereof, wherein the interface section is covered by closing the operating section and is exposed by opening the operating section.

10. A recording apparatus comprising:
    a recording device that performs recording on a recording medium;
    a housing that includes the recording device, the housing being formed of a front-surface section, two side-surface sections, and a rear-surface section, wherein the front and rear surface sections are disposed between the two side-surface sections; and
    a cassette that stores a recording medium and can be pulled out from the front side of the recording apparatus, the cassette including a front-surface section cover that covers and uncovers at least a portion of the front surface section of the recording apparatus and extending from a first one of the side-surface sections to a second one of the side-surface sections such that the front-surface section has a completely same width as a lateral width of the recording apparatus.

11. The recording apparatus according to claim 10, further comprising an interface section at the front-surface section thereof, wherein the interface section is covered by closing the front-surface section cover and is exposed by opening the front-surface section cover.

* * * * *